(12) United States Patent
DeJonge et al.

(10) Patent No.: US 6,405,611 B1
(45) Date of Patent: Jun. 18, 2002

(54) ELECTRICAL SENSING SYSTEM FOR A VEHICLE SHIFTER

(75) Inventors: Robert A. DeJonge, West Olive; Eric W. Bryant, Grand Haven, both of MI (US)

(73) Assignee: Grand Haven Stamped Products, Grand Haven, MI (US)

( * ) Notice: Subject to any disclaimer, the term of this patent is extended or adjusted under 35 U.S.C. 154(b) by 0 days.

(21) Appl. No.: 09/570,753

(22) Filed: May 15, 2000

Related U.S. Application Data

(63) Continuation-in-part of application No. 08/962,434, filed on Oct. 31, 1997.
(60) Provisional application No. 60/052,705, filed on Jul. 16, 1997.

(51) Int. Cl.[7] .............................................. F16H 59/10
(52) U.S. Cl. ...................................... 74/335; 76/473.18
(58) Field of Search .............................. 74/335, 473.18; 200/61.88

(56) References Cited

U.S. PATENT DOCUMENTS

| | | | | |
|---|---|---|---|---|
| 5,056,376 A | * | 10/1991 | Moroto et al. ................. | 74/335 |
| 5,127,388 A | * | 7/1992 | Hojo et al. .................... | 74/335 |
| 5,566,579 A | * | 10/1996 | Willford et al. ............... | 74/335 |
| 5,584,209 A | * | 12/1996 | Issa .............................. | 74/335 |
| 5,799,539 A | * | 9/1998 | Haase ...................... | 74/473.18 |
| 5,868,033 A | * | 2/1999 | Nishino et al. ........... | 74/335 R |
| 6,012,352 A | * | 1/2000 | Ishii et al. ................ | 74/473.18 |
| 6,065,360 A | * | 5/2000 | Hollingsworth et al. ...... | 74/335 |
| 6,209,408 B1 | * | 4/2001 | DeJonge et al. .............. | 74/335 |

* cited by examiner

*Primary Examiner*—Charles A Marmor
*Assistant Examiner*—Ha Ho
(74) *Attorney, Agent, or Firm*—Price, Heneveld, Cooper, DeWitt & Litton

(57) ABSTRACT

A shifter system for shifting a transmission on a vehicle includes a shifter having a manually-operated shift lever movable between various gear positions, an electrical sensing device on the shifter for sensing positions of the shift lever, and a controller electrically connected to the sensing device and constructed to control shifting of a transmission based on signals from the sensing device indicative of the position of the shift lever. The controller and the sensing device as a system are capable of sensing speed of movement of the shift lever and the controller is programmed to change control of the shifting of the transmission in accordance therewith. In one form, the sensing device includes one of a continuous output potentiometer, a discrete output potentiometer, a membrane potentiometer, and a deformable variable-resistance potentiometer.

13 Claims, 16 Drawing Sheets

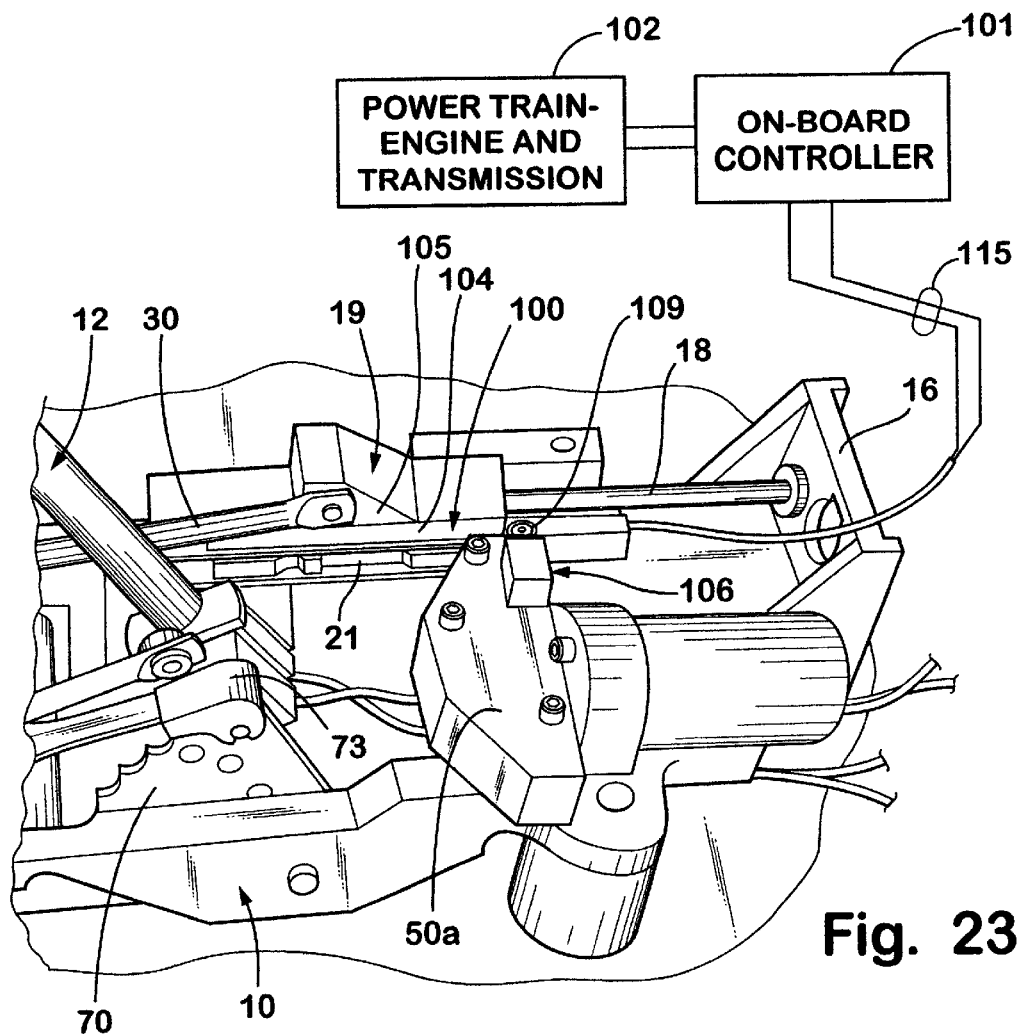
Fig. 23
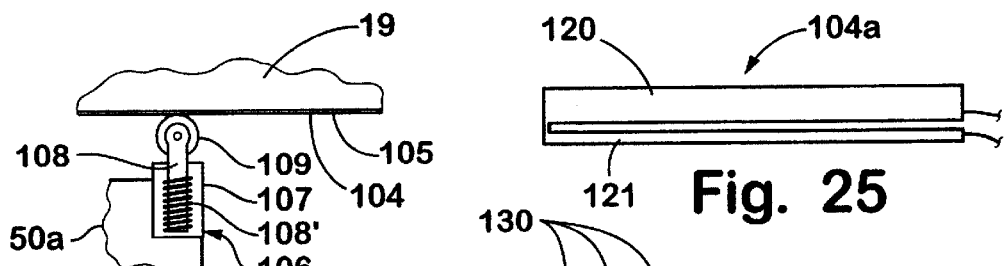
Fig. 24
Fig. 25
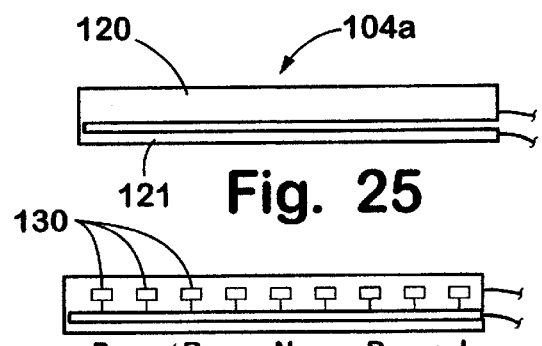
Fig. 26
Fig. 24A

ELECTRICAL SENSING SYSTEM FOR A VEHICLE SHIFTER

CROSS-REFERENCE TO RELATED APPLICATIONS

This application is a continuation-in-part of U.S. patent application Ser. No. 08/962,434 filed Oct. 31, 1997, entitled ELECTRICAL SENSING SYSTEM FOR VEHICLE SHIFTER, which claims priority under 35 U.S.C. §119(e) on U.S. Provisional Application No. 60/052,705, entitled "Vehicle Shifter" filed on Jul. 16, 1997, by Robert A. DeJonge and Daniel J. Fisher.

BACKGROUND OF THE INVENTION

The present invention generally relates to an electrical sensing system for a vehicle shifting system. More particularly, the present invention relates to an electrical sensing system that senses the position of a shift lever.

In the early years of automobiles, most automobiles included manual shift transmissions where an operator separately controlled clutch disengagement/engagement, speed of shifting, and engine rpm (i.e., throttle operation) as part of the shifting process. Modern vehicles in the United States are predominately automatic shift transmissions, where an operator merely positions a shift lever in a selected gear position and then presses on an accelerator, while the vehicle systems automatically control the speed of clutch engagement and the timing of shifting. Specifically, in modern automatically shifted vehicles, the operator positions a shift lever in park, reverse, neutral, or drive. However, the act of positioning the shift lever in a selected gear position is totally separate from controlling the actual shifting process, such that it does not give an operator the control provided by manually shifted transmission systems. It is desirable to come up with a design that does not require drivers to learn how to shift a manual vehicle transmission, including learning how to operate a clutch pedal, a brake pedal, and an accelerator pedal while simultaneously shifting a shift lever. Further, it is desired to provide a system compatible with existing driving skills and control technologies, and to provide a system where the driver does not have to operate a clutch if he or she prefers not to do so. In short, it is desirable to give more control of the shifting process back to the vehicle driver, but it is desired to do so in a manner that does not force the driver to relearn how to operate the vehicle and that allows the driver to be as active or passive as he or she may want to be. It is also desirable to utilize technologies that are compatible with and that take full advantage of the electronic vehicle systems in modern vehicles.

In general, an automatic transmission selects the appropriate gear ratio without direct driver input. Existing automatic transmissions include a mechanical system, as well as an electronic control system. Such automatic transmissions consist of a series of mechanical sub-systems which accept rotational input from the engine and deliver it to the driving wheels. These sub-systems are sequential in that the output of the first system provides the input to the second system, and so on. The rotational output from the engine is connected via the crankshaft to the torque converter. The torque converter is a fluid coupling which transfers drive torque from the engine into the transmission. A fluid coupling is the preferred choice for this application as the rotational forces are transmitted through a fluid, rather than a fixed mechanical link. This enables some slipping in the couplings so that harsh engine vibrations and shocks are not transmitted down the driveline. A further effect is that, while the coupling is slipping, the transmitted torque is multiplied, hence the name of this component. This effect is useful in accelerating a vehicle from stationary ("launch feel"). The operation of the torque converter may be visualized as to the electric fans, face to face. As one fan is turned, the flow of air causes the second fan to rotate as well. In the case of a torque converter, the drive side is called the impeller and is connected directly to the engine crankshaft. The driven side is the turbine in which then provides the rotational input into the transmission. Modern torque converters may also include a lock-up clutch. A lock-up clutch is an internal mechanical feature which prevents the torque converter from slipping. The lock-up clutch is applied when the vehicle is at cruising speed to improve efficiency and fuel economy. Design of the torque converter is dependent on the engine characteristics. The torque converter must be able to handle the torque capacity and torsional stresses generated by the engine, while not generating too much heat. Vehicle driveability and launch feel is another important consideration.

Rotating elements within an automatic transmission are coupled by the series of clutches. By applying these clutches in specific combinations, the appropriate gears are selected to transmit the torque. The clutches and bands within the transmission are also referred to as the shifting elements. Their function is to couple the rotating elements within the transmission in order to drive or to hold the gears, and thereby achieve the different gear ratios. The shift elements are also important in controlling the shift quality, and can make the difference between a silky smooth gear shift or a harsh shift. Clutches are multiple-disc type units of automatic transmission which feature a series of friction plates stacked in parallel. When released, the individual plates are able to slip and rotate freely. When applied, the clutch pack is compressed by a servo piston forcing the individual plates to lock and rotate together. Thus, when the clutch is released rotating elements can turn independently. When a clutch is applied, rotating elements are coupled. Brake bands generally comprise a steel strap lined with a high-friction material. The strap wraps around a rotating cylinder, and permits free rotation of the cylinder when the band is released. Pressurized oil can be selectively supplied to a servo piston, thereby causing the band to wrap tightly around the cylinder and hold it stationary. Hence, brake bands are used to hold a rotating element stationary. During a shift, the clutches and bands are applied or released in combination to achieve a specific gear state. By regulating the oil pressure, the shift elements can be applied in a controlled manner such that torque is transferred smoothly.

The gear set is a mechanism of the mechanical system by which the input speed is reduced and the input torque is multiplied. One known arrangement includes planetary gears, which are axisymmetric about the centerline of the transmission. A typical arrangement in a modern automatic transmission is a "Ravigneaux" gearset including one forward sun gear, one reverse sun gear, and one planet gear supporting three long planet pinions and three short planet pinions. The Ravigneaux gearset also includes one ring gear connected to the output shaft of the transmission. By alternately driving or holding the first three elements in combination, the ring gear/output shaft is driven at different speeds, and the different gear ratios are obtained. The output from the transmission is connected to the propeller shaft (or transfer case in a 4WD vehicle). The rotation of the propeller shaft is directed to the driving wheels by the differential.

In addition to the mechanical system including the torque converter, clutches and bands, and gear set described above, modern automatic transmissions often include an electronic control system that provide the "brains" of the transmission. The electronic control system determines when gear shifts are required and then controls the shift quality during the execution of a gear shift. The electronic control system typically includes an electronic control unit (ECU), and an electrohydraulic unit (valve body). The ECU is a microprocessor which may be integrated into the engine control module or housed in a "stand alone" module. It is usually located in the vehicle interior and connected to the transmission and other systems via a wiring loom. The ECU continuously monitors a series of input signals provided by sensors. The input signals may include vehicle road speed, engine speed (rpm), transmission oil temperature, throttle position, rate of throttle opening, gear lever position, and mode switch. The ECU processes the input signals according to a series of algorithms to determine the current driving condition and the appropriate gear state for the transmission. If the appropriate gear state is different from the current gear state, the ECU initiates the shift to the desired gear state. During the shift, the ECU also actuates the electrohydraulic control system to ensure smooth shift feel.

The electrohydraulic unit or valve body of an automatic transmission is a hydraulic control system driven by the electrical output of the ECU. In one form, the electrohydraulic unit consists of electrically operated solenoids and a series of mechanical valves assembled within a die-cast aluminum housing. The valves direct automatic transmission fluid (ATF) to different circuits in the transmission, thus activating the mechanical systems. The electrohydraulic unit forms part of the transmission hardware, and is housed in the transmission oil sump. The control system is highly sophisticated and integral to the correct operation of the transmission. It comprises a number of on/off solenoids which are used to toggle valves and control the gear state. The system also features one or more variable pressure solenoids (VPS) which modulate oil pressure corresponding to the current (electrical signal) from the ECU. The VPS is used to modulate pressure to the clutches during a shift, hence controlling the shift feel.

Some modern vehicles manufacturers are now specifying and/or designing shifting systems for automatic transmissions having an automatic shift mode (such as the well-known gear positions of "park," "reverse," "neutral," and "drive" in most existing automatic transmission vehicle shifters), but also having a manual shift mode (where the shifter is movable between forced "upshift" and "downshift" positions, or where the shifter is movable between a forced fourth gear, a forced third gear, a forced second gear, and a forced first gear). These arrangements give some control back to a driver by allowing the driver to force certain gear changes in automatic transmissions, but they do not give an operator the "total" control and feel of early manual shifting systems, since these known systems do not allow the operator to directly affect or control the clutch, the speed of shifting, and the engine responses to same, as discussed above. For example, in known systems, clutch engagement and gear engagement is at best only indirectly affected by how hard a vehicle driver presses on the accelerator pedal of the vehicle. The driver does not directly control the clutch by any manipulation of a clutch pedal or clutch controller. The speed of shifting the shift lever into a gear position also has no direct effect on clutch operation, or engine/transmission parameters or vehicle operation.

In addition to the above, different vehicle operators prefer different "feels" of clutch engagement when shifting between gear positions. For example, some operators want a rugged, stiff "hard clutch" feel as a shift lever is moved between gear positions, while others prefer a smooth, "soft clutch" feel. Operators similarly differ in their preferences for engine speed and performance when shifting. Importantly, a specific operator's preferences may change over time, such as when a road is slippery with snow or ice, or when the road is dry and providing good traction. Vehicle manufacturers have attempted to provide different shifters and transmissions tailored for particular types of customers (e.g., sport car-type drivers or luxury car-type drivers) that customers can select from, and further have attempted to match shifters and transmissions to the types of customers expected to buy particular vehicle models. However, to our knowledge, vehicle manufacturers have not constructed a shifting system including a shifter that is variable and sensitive to shift behaviors of an operator as a shift lever is shifted, or that is adapted to make "real time" changes in shifting and vehicle operation as a result.

Most modern vehicles have shifters that include shift levers mechanically connected to a transmission such as by a Bowdan transmission cable or a rod-type mechanical linkage. This was done in part since mechanical connections were believed to be very reliable and trustworthy for the environment under a vehicle where a transmission is located. However, mechanically connected shift levers are expensive, relatively large, and include many parts. Also, the assembly of these shifters into vehicles is labor intensive and takes up valuable assembly space.

An improved system solving the aforementioned problems and having the aforementioned advantages is desired.

SUMMARY OF THE INVENTION

Accordingly, it is an aspect of the present invention to solve the above problems by providing an electrical sensing system for a shifter that provides not only information identifying the gear selected by the driver, but also information indicating the relative force applied to the shift lever. It is another aspect of the invention to provide a shifting mechanism that changes the smoothness or the hardness of the shift performed by the vehicle transmission based upon the force applied to the shift lever by the driver when shifting between gears. Still another aspect of the invention is to provide a shifter that outputs additional information from which the velocity of the shift lever may be derived by a transmission controller or a separate controller.

To achieve these and other aspects and advantages, the shifting system of the present invention comprises a shift lever movable between gear positions for operating a vehicle transmission, and a sensing device for sensing positions of the shift lever including at least one position that is intermediate the two gear positions, the sensing device generates an electrical output signal indicating movement of said shift lever between the two gear positions when the sensing device detects the presence of said shift lever at the at least one position.

Another aspect of the present invention is to provide an electrical sensing system for a shifting mechanism that enables the gear positions of the shifting mechanism to be reconfigured and customized after manufacture without requiring a change in hardware. To achieve this and other aspects and advantages, the electrical sensing system of the present invention comprises sensing means for sensing a position of the shift lever relative to the two-dimensional plane and for generating an electrical output signal representing the sensed position of said shift lever, and a controller for associating specific transmission gears with defined positions of the shift lever that are sensed by the sensing means. The controller preferably includes means for enabling an operator to select which transmission gears the controller associates with the defined positions.

These and other features and advantages of the present invention will be further understood and appreciated by those skilled in the art by reference to the following specification, claims and appended drawings.

BRIEF DESCRIPTION OF THE DRAWINGS

FIG. 23 is a fragmentary perspective view of a modified shifter embodying the present invention including a sensing device comprising a discrete location-sensing membrane potentiometer for sensing position of the shift lever;

FIG. 24 is a fragmentary top view of the shifter shown in FIG. 23 including the membrane potentiometer and a roller operably engaging the potentiometer;

FIG. 24A is a schematic side view of the membrane potentiometer shown in FIG. 24;

FIG. 25 is a plan view of a continuously sensing, variable resisting-type membrane potentiometer that can be used in place of the potentiometer shown in FIG. 24;

FIG. 26 is a plan view of a modified sensing device including a plurality of Hall Effect sensors;

DESCRIPTION OF THE PREFERRED EMBODIMENTS

Figure 1:
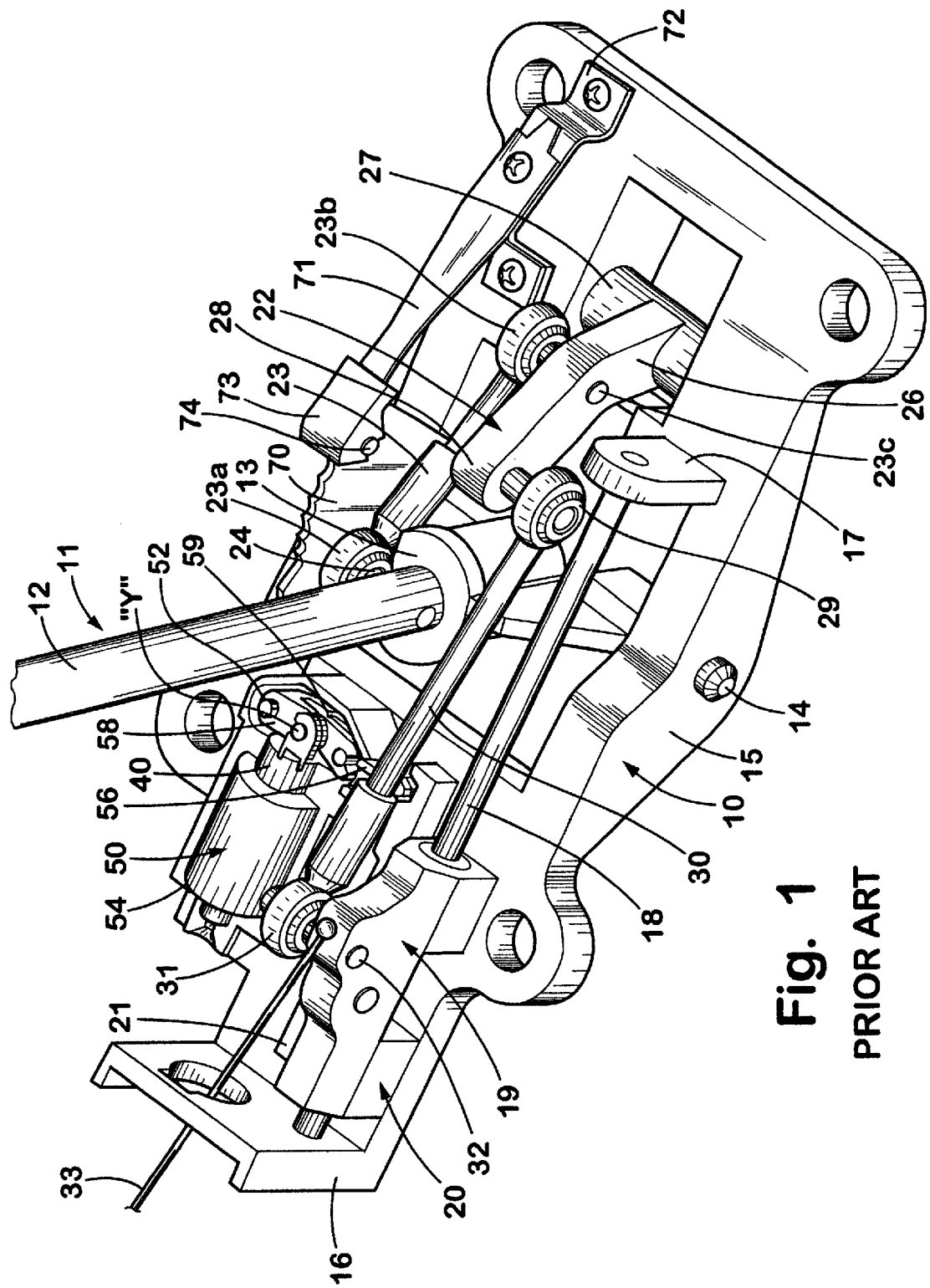
FIG. 1 is a top, side-elevational perspective view of a shifter.
Figure 2:
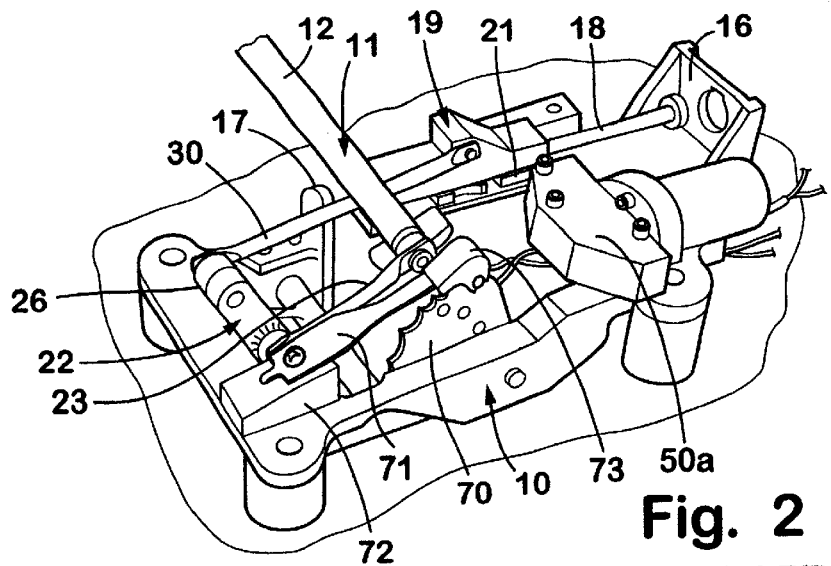
FIGS. 2–5 are side, top perspective views of the embodiment of FIG. 1 but disclosing a slightly different shape of a control module.
Figure 3:
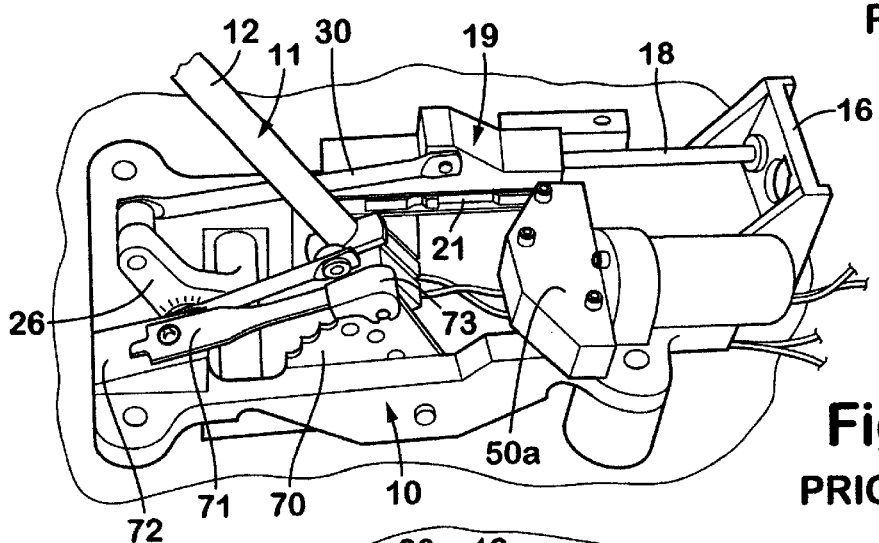
Figure 4:
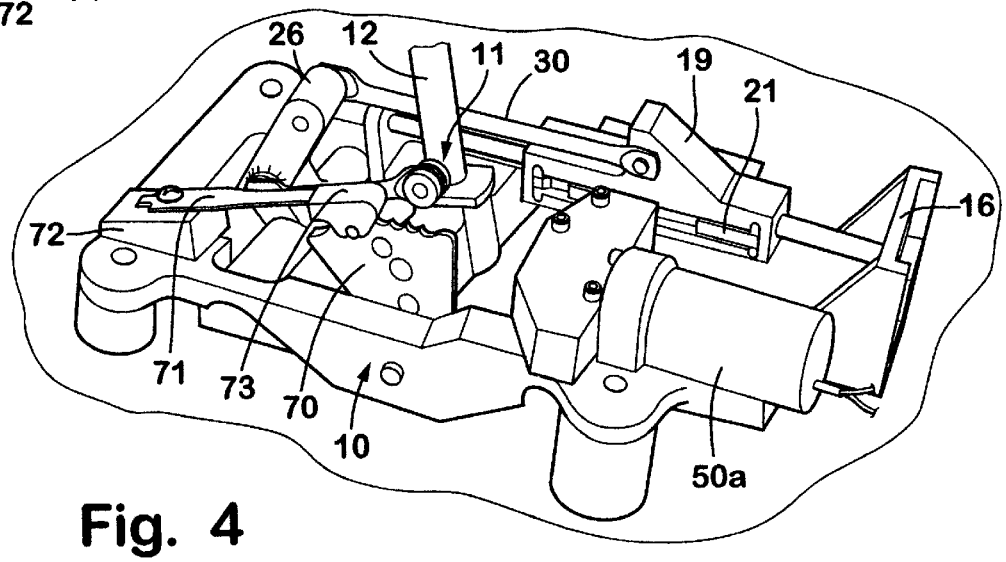
Figure 5:
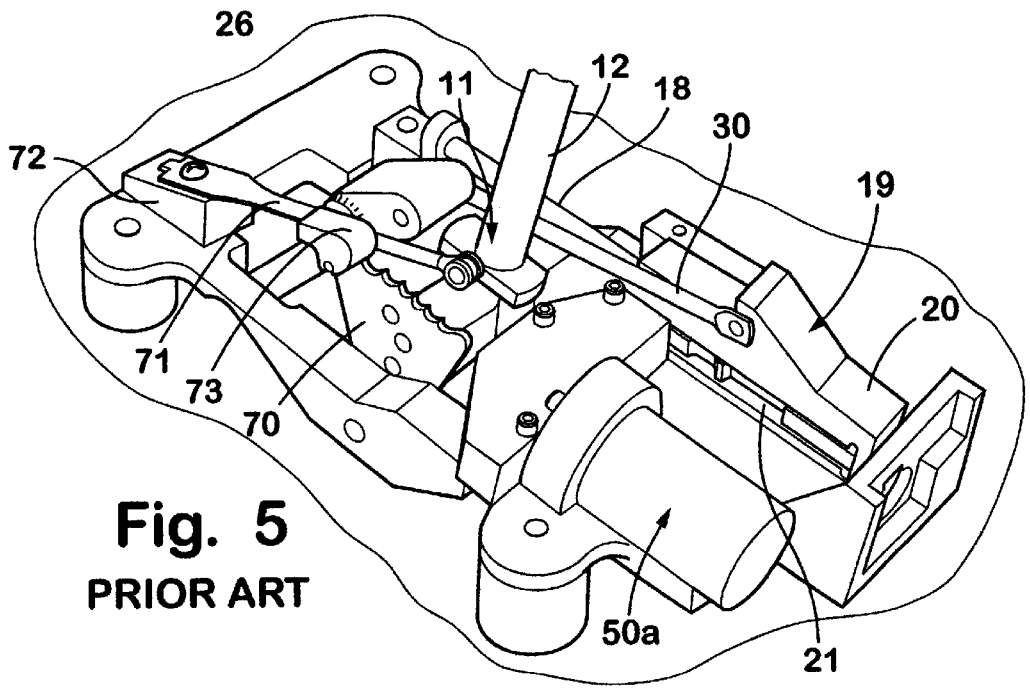
Figure 6:
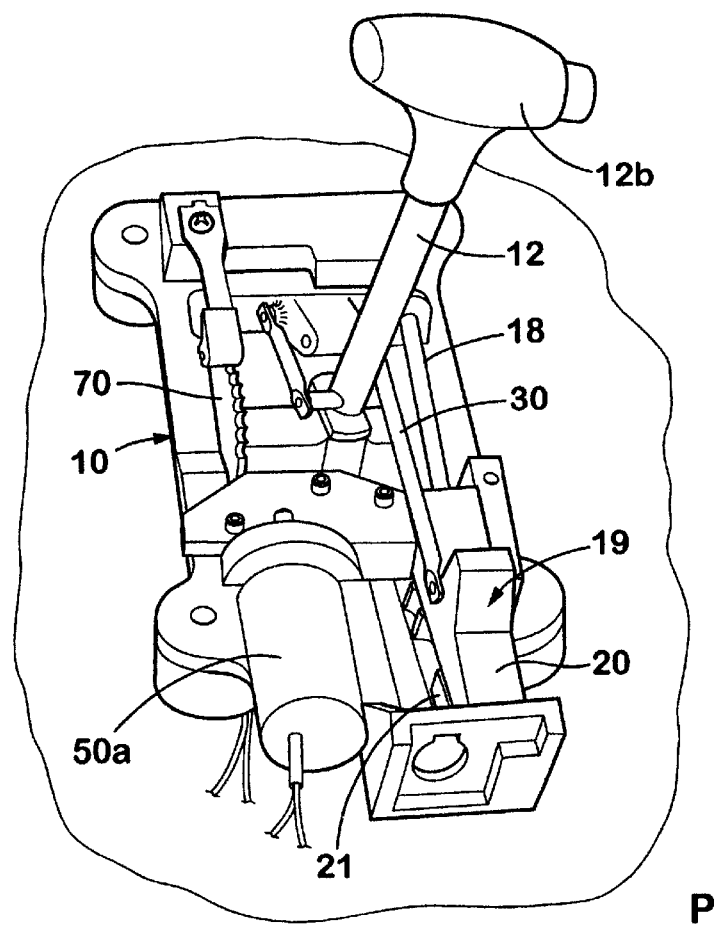
FIG. 6 is a front, top perspective view of the shifter mechanism of FIGS. 2–5.

Initially, we describe a shifter that the present. invention can be attached to or incorporated into, and then in FIGS. 23–27 we describe the focus of the present inventive improvement. Referring to the drawings and particularly FIGS. 1–8, reference numeral 10 designates a base which can be constructed of metal or plastic, preferably plastic. A shift lever assembly 11 including the shift lever 12 and the base 13, is pivotally. mounted on base 10 by means of the shaft 14 extending through the sides 15. The upstanding support members 16 and 17 extend upwardly from the base 10 and support the guide 18 which in this embodiment is a guide rod for slidably supporting the detent assembly 19 which includes the block 20 to which is attached or integrally formed therewith the detent member 21. Thus, the detent assembly including detent member 21 is slidable on the guide rod 18.

Detent assembly 19 is operatively connected to the shift lever assembly 11 by a mechanism including the stroke multiplier assembly 22 which includes the rod 23 pivotally connected at one end 23a to the shift stick 12 by means of the pivot pin 24. The other end 23b of rod 22 is pivotally connected to the arm 26 by pivot pin 23c. Arm 26 is pivotally connected at one end by pivot pin 27 to the base 10 and at the other end 28 is pivotally connected to one end 29 of link rod 30. The other end 31 of link rod 30 is pivotally connected by pin 32 to the detent assembly 19.

It should be evident from the drawings as disclosed in FIGS. 1–6 that the stroke multiplier assembly 22 is provided to multiply the pivotal movement of lever assembly 11. Such movement is translated to the sliding movement of the detent assembly 19 so that the detent member 21 is slidable a proper distance horizontally along the base 10 to meet the stroke requirements for the transmission to which cable 33 is attached. This arrangement of the stroke multiplier assembly 22 can be modified to meet the stroke requirements for any specific transmission which is actuated by a cable or rod 33 connected to the top of the detent block 20.

Figure 13:
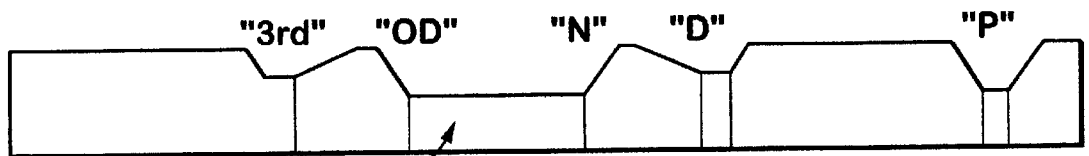
FIG. 13. is an outline of the notches of a typical detent member as utilized in the shifter mechanisms of FIGS. 1–11.
Figure 14:
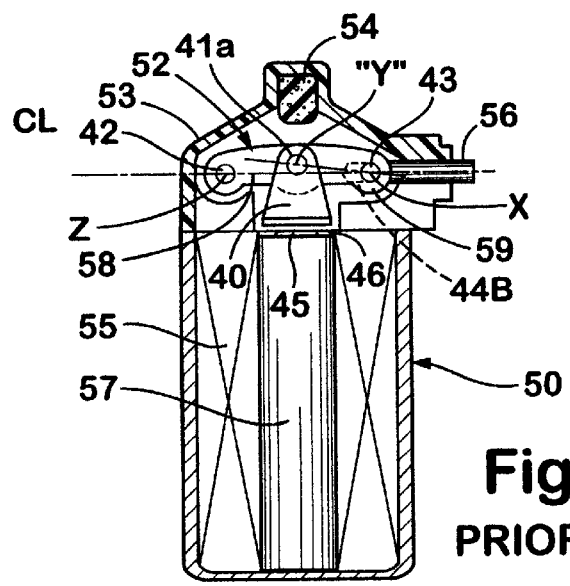
FIG. 14 is a figure from U.S. Pat. No. 5,494,141, previously referred to, and incorporated in this application so as to illustrate a type of control module.

A module 50 like that described in U.S. patent application Ser. No. 08/331,358, or U.S. Pat. No. 5,402,870, which are hereby incorporated by reference, is mounted at the side of the detent member 21 in a horizontal position and is stationary with respect to the movable detent member 21. Module 50 controls the position of its pin 56 which in a locked position extends into a "PARK" notch "P" (FIG. 13) of the detent member 21. The position of the pin 56 is controlled by the magnetic attraction or repelling of the toggle linkage 52, which determines the locked or the unlocked position of the pin 56. As best disclosed in FIG. 14, toggle linkage 52 is mounted in housing 53 and comprises the three links 58, 59, and 40, all of which are pivotally connected together at one of their ends on the pivot pin 41a about the axis "Y." The other end of link 58 is pivoted on the pin 42 about the fixed axis "Z." The other end of link 59 is pivotally mounted by the pivot pin 43 to the locking member pin 56 for pivotal movement about the axis "X." The ends of pin 43 are slidable in the groove 44b. In the locked position of locking member 56, the two axes "X" and "Z" are substantially on a center line "CL" with the axis "Y" located slightly above center line "CL." The distance of the axis "Y" spaced above the center line "CL" is governed by the bottom end 46 of link 40 abutting the top end of the coil 55 of the module 50. This distance is selected to provide the proper restraining force exerted by the toggle unlocking member 56, it being understood that as the axis "Y" moves away from the center line "CL," the amount of force required to move the locking pin out of the locked position substantially decreases. Therefore, the slight spacing of axis "Y" above the center line "CL" is selected so that the restraining force on pin 56 prevents the driver from displacing the pin toward the unlocked position when the brakes are not applied and a gear selector switch 61 (FIG. 15) located in the handle 12b (FIG. 6) is not actuated. In other words, as disclosed by the circuit of FIG. 15, gear selector switch 61 actuated by the operator of the vehicle and brake switch 62 must both be closed to energize the coil 55 of the module 50. When in "PARK" position, magnet 45 which has a south pole is normally attracted to core 57 when the coils 55 are de-energized.

Figure 15:
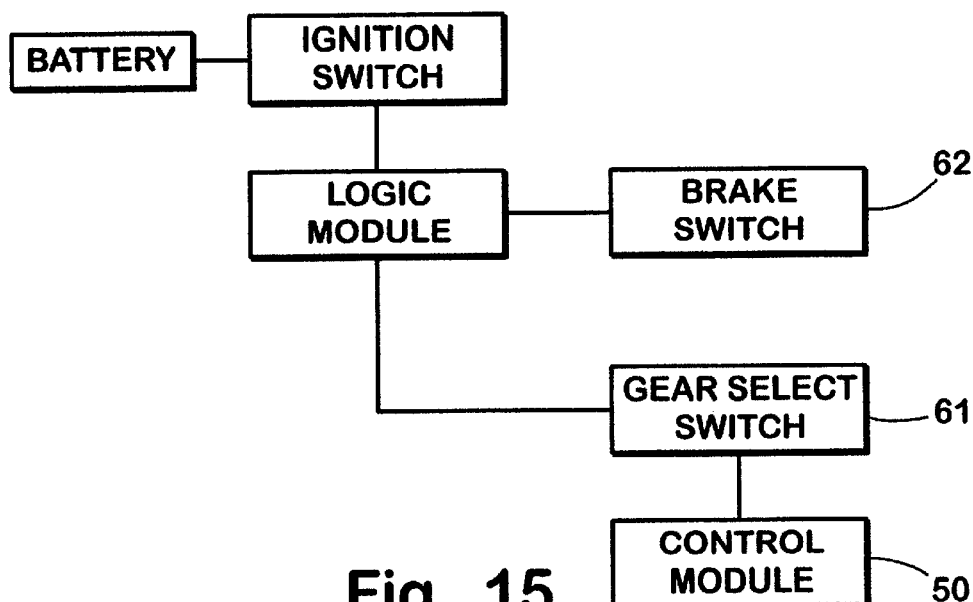
FIG. 15 is a circuit diagram for controlling the energization of the coil of the control module of FIGS. 1–11.
Figure 17:
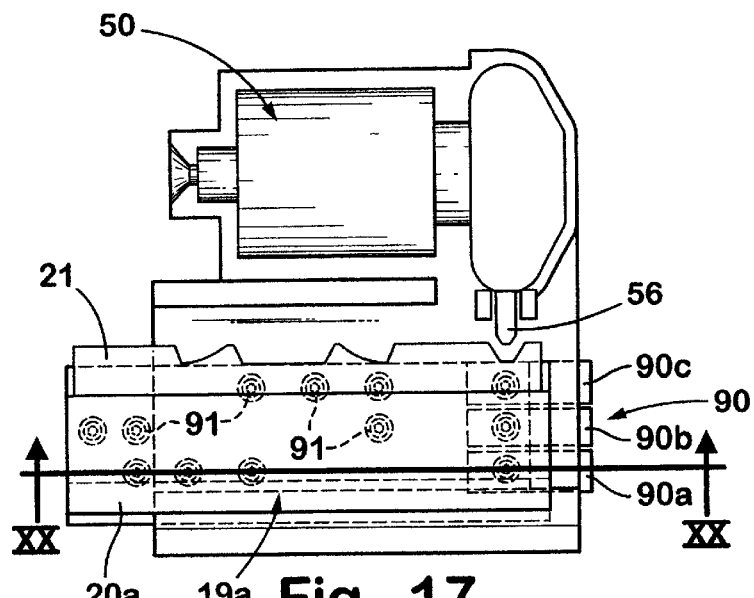
FIG. 17 is a plan view of a sketch of a shifter position switch assembly for generating signals to control an electronically controlled transmission utilizing the shifter mechanism of FIG. 12.
Figure 18:
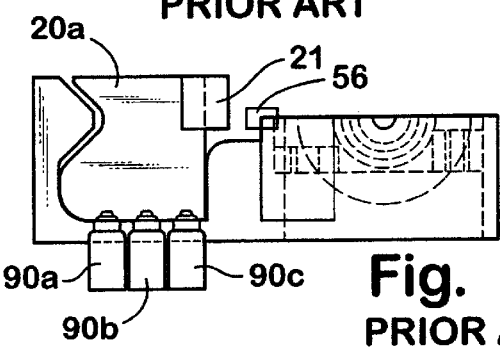
FIG. 18 is an end elevational view of the shifter position switch assembly of FIG. 17.
Figure 19:
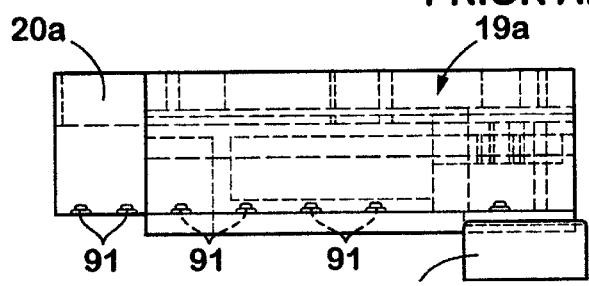
FIG. 19 is a side-elevational view of the shifter position switch assembly of FIG. 17.
Figure 20:
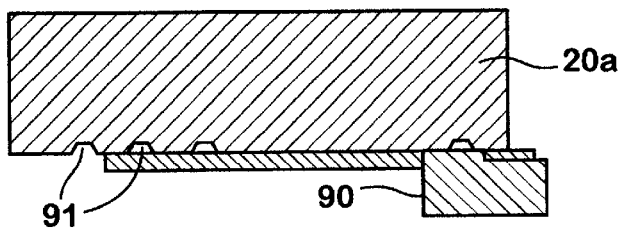
FIG. 20 is a cross section taken along the plane XVIII–XVIII of FIG. 17.
Figure 21:
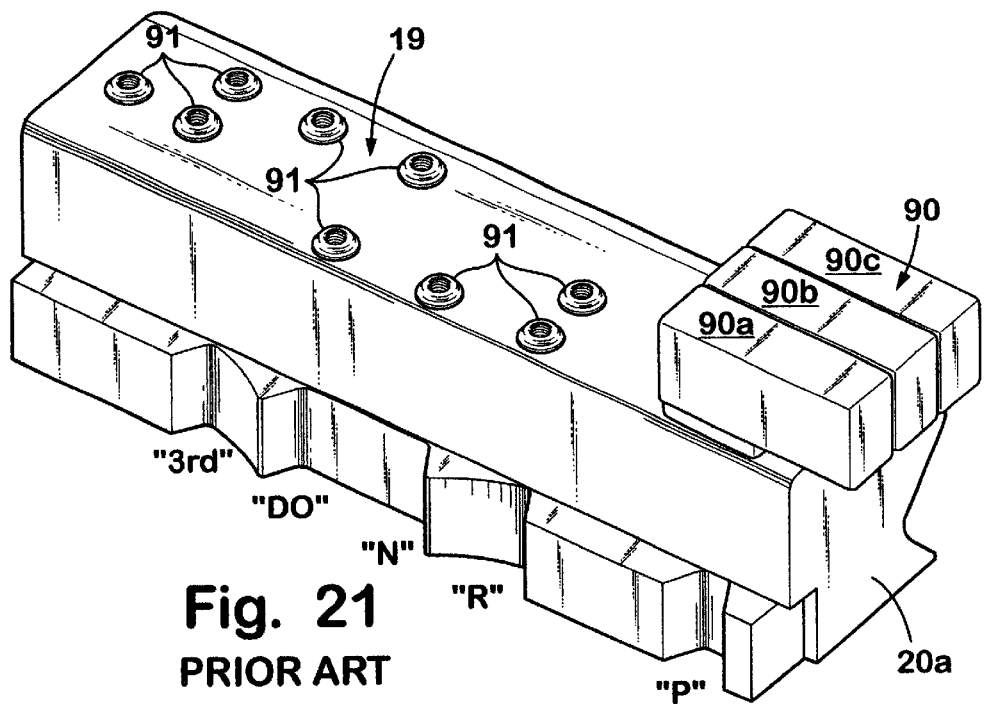
FIG. 21 is a bottom, side-elevational view of a portion of the assembly of FIG. 17.

FIG. 15 discloses a block diagram which includes a "Battery" which provides the power for the vehicle, an "Ignition Switch" which turns the power "on" and "off," a "Logic Module" that receives signals from the "Brake Switch" 62 and from other well-known sources within a vehicle. The "Logic Module" along with the "Gear Selector Switch" 61 controls the energization of the coil 55 of the "Control Module" 50 so as to control the "Control Module" as set forth above. All of this is well within the skill of one in the art.

When coil 55 is energized core 57 becomes a south pole, i.e., like that of magnet 45. This results in core 57 repelling the south pole of the magnet 45 embedded in the end of the link 40. The link 40 is thus forced upwardly to a position against the bumper 54 which has an elastomeric surface to provide a soft contact and thus reduces any clicking noise which might result when the toggle joint 52 reaches the upper position. When forced upwardly, the toggle joint 52 pulls locking member pin 56 substantially out of the park "P" notch permitting the shift lever 12 (see FIG. 13) to be shifted to the reverse "R" position and the neutral "N" and overdrive "OD" positions. It will be noted that the dwells of the neutral "N" and overdrive "OD" positions are identical to the dwell of the park "P" position. When in neutral "N" and drive positions, the "Logic Module" eliminates the requirement for the brake switch to be actuated for energizing the coil 55 of module 50. However, actuation of the handle or gear selector switch 61 located in knob 12b (FIG. 6) is still required to energize coil 55. Therefore, to shift from "OD," actuation of switch 61 in knob 12b is required before the shifting lever can be shifted to the notch of the third gear notch "3RD."

In order to give a feel to the shifting of the shift lever 12, a so-called rooster comb 70 is provided which is directly connected to the shift lever assembly 11 so that it moves as the shift lever is pivoted about the axle 14. A leaf spring 71 attached to the bracket 72, which is in turn secured to the base 10, has a roller assembly 73 attached to its end. This roller assembly 73 includes a roller 73a (FIG. 8) pivotable on the pin 74 and engaging the undulations of the rooster comb 70.

Figure 8:
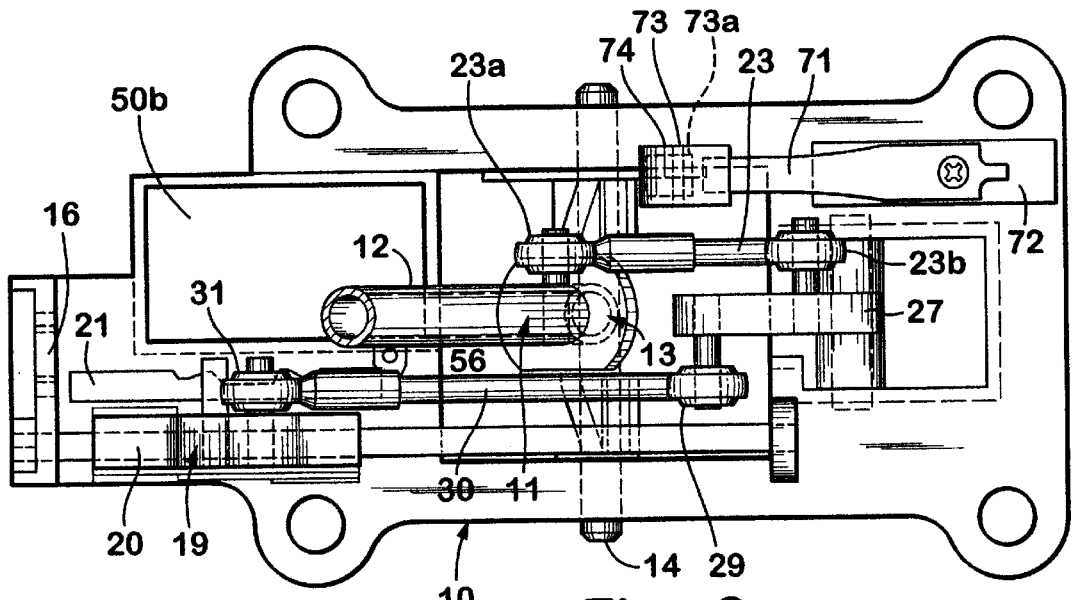
FIG. 8 is a plan view of the shifter mechanism of FIG. 7.
Figure 7:
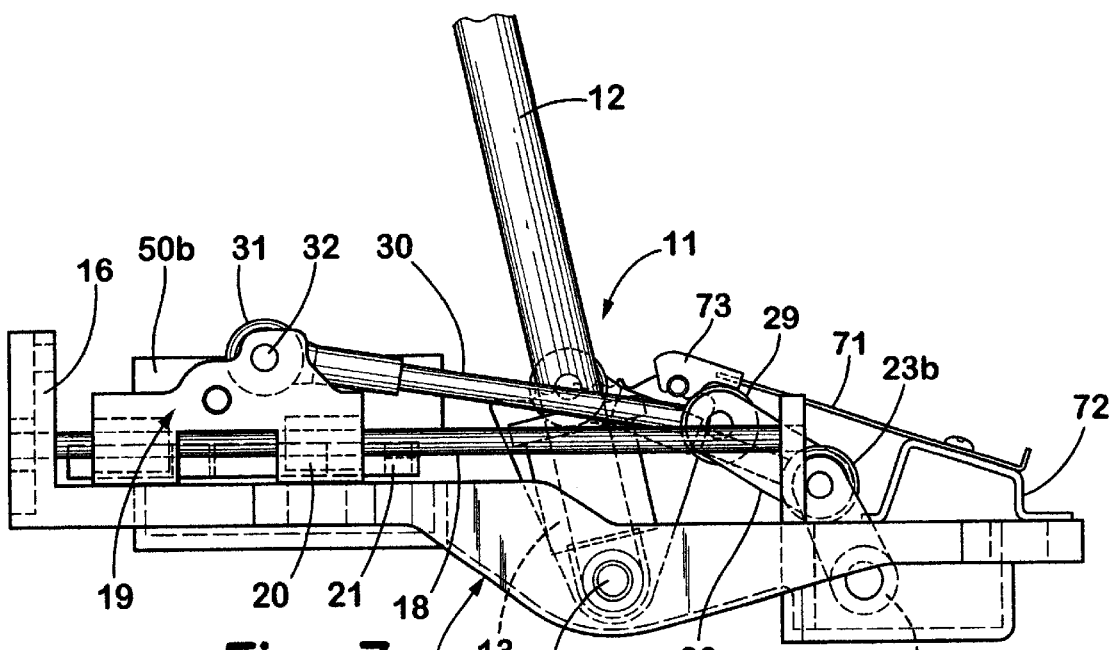
FIG. 7 is a side-elevational view of the shifter mechanism of FIGS. 1–6 showing the control module enclosed within a housing.
Figure 9:
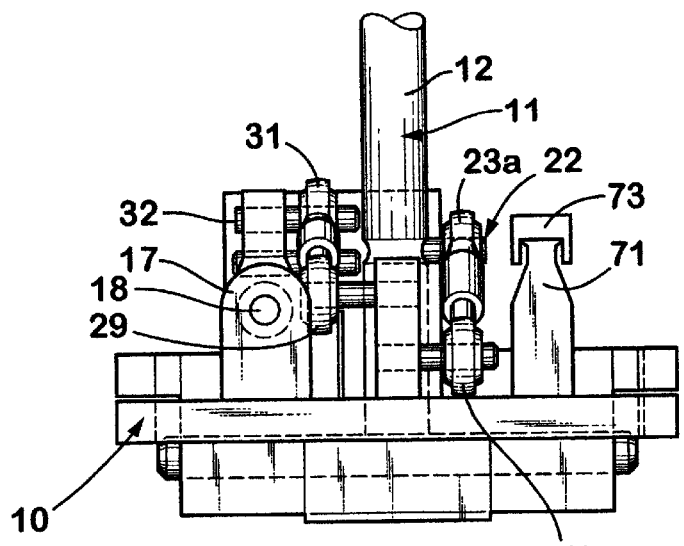
FIG. 9 is a rear elevational view of the shifter mechanism of FIGS. 7 and 8.

It should be understood that FIGS. 2–6 are substantially identical to the shifter mechanism of FIG. 1. The difference is in that the shape of the module 50a is slightly different from that of module 50 as disclosed in FIG. 1. Further, it should be clear that the mechanism as disclosed in FIGS. 7–9 is substantially the same as disclosed in FIGS. 1–16. The only difference is that the module is shown located within a housing identified by reference numeral 50b.

Figure 10:
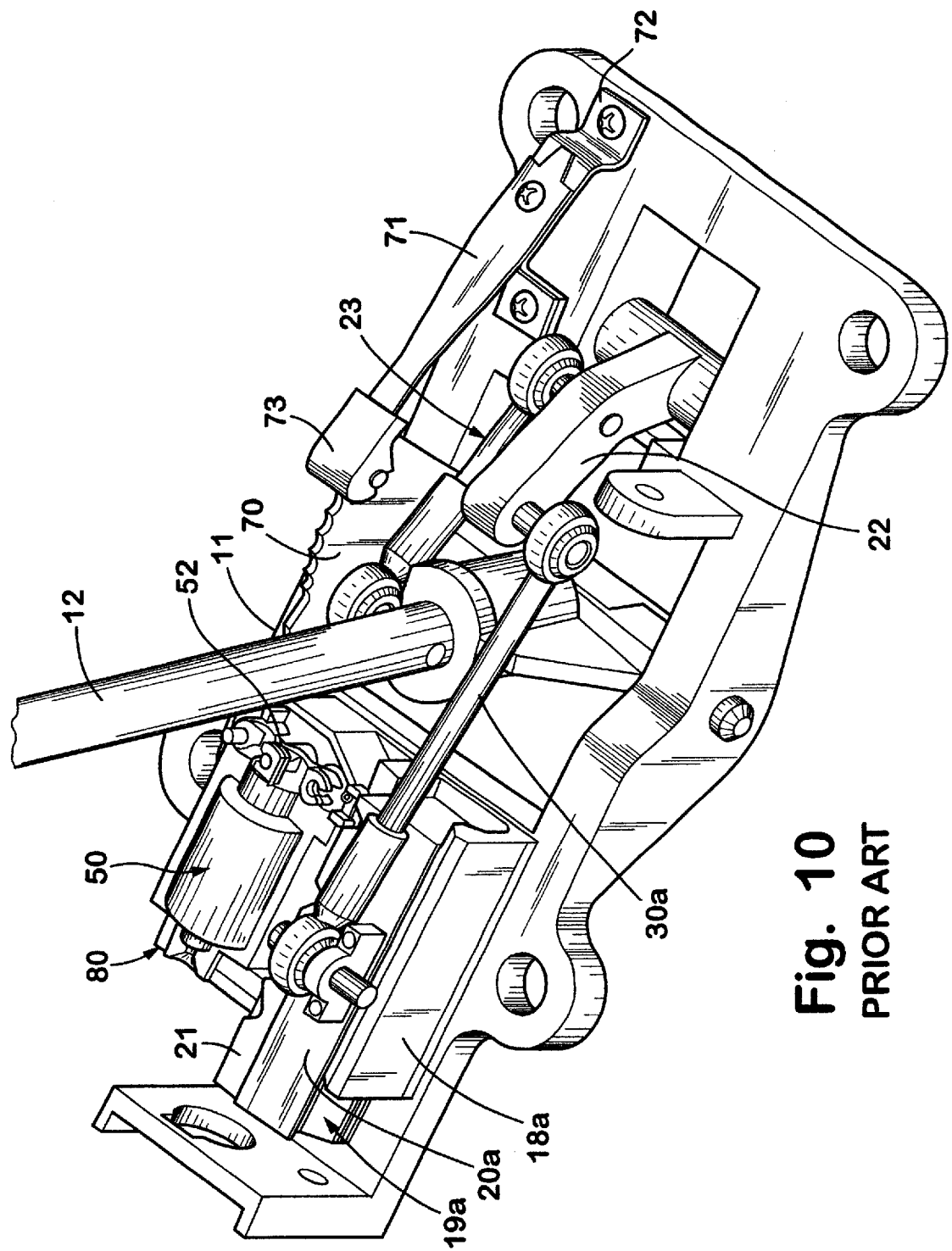
FIG. 10 is a top perspective view of a modified shifter mechanism in which the detent member is slidably mounted in a slide box.

Referring to FIG. 10, it is disclosed a modification in which the primary difference is in the guide 18 for the detent assembly designated by the reference numeral 19a. This guide 18 for the detent assembly is a slide block 18a having a channel 18b in which block 20a is slidably mounted. As disclosed, the connecting rod 30a is pivotally connected to the detent assembly 19a which includes block 20a and detent member 21 which can be one piece or integrally connected elements. FIG. 10 discloses the subassembly 80 shown in greater detail in FIG. 11. Subassembly 80 includes the module 50a, the slide block 18a and detent assembly 19a. Subassembly 80 has a decided advantage for use on shifters having different throws for different shifting transmissions. Substantially the entire subassembly can be used on different shifting assemblies requiring only a change in the position of the various notches for "PARK," "REVERSE," "NEUTRAL," and the drive positions. It should be understood that the detent assembly 19a can include the integral parts 20a and 21 or they can be separate parts secured together in one way or another.

Figure 11:
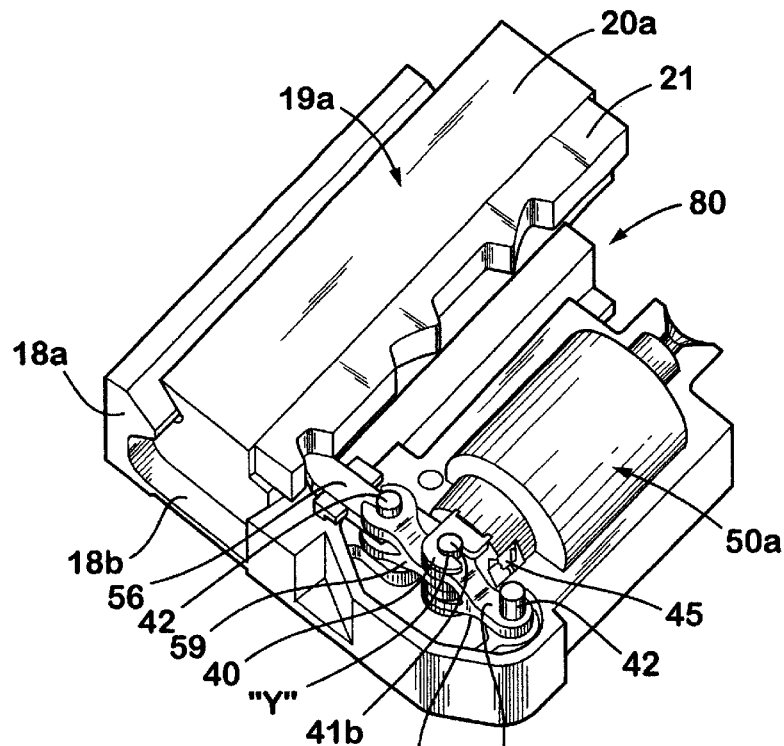
FIG. 11 is a partial side, top perspective view disclosing a subassembly of the shifter mechanism disclosed in FIG. 10.

It should be understood that one aspect of this shifter is the subassembly as disclosed in FIG. 11 wherein a slide block 18a is integrally connected to the housing for the module 50a. It is preferred that the slide block 18a and the housing for the module 50a be molded as one piece so that it can be mounted on different shifter assemblies.

Figure 12:
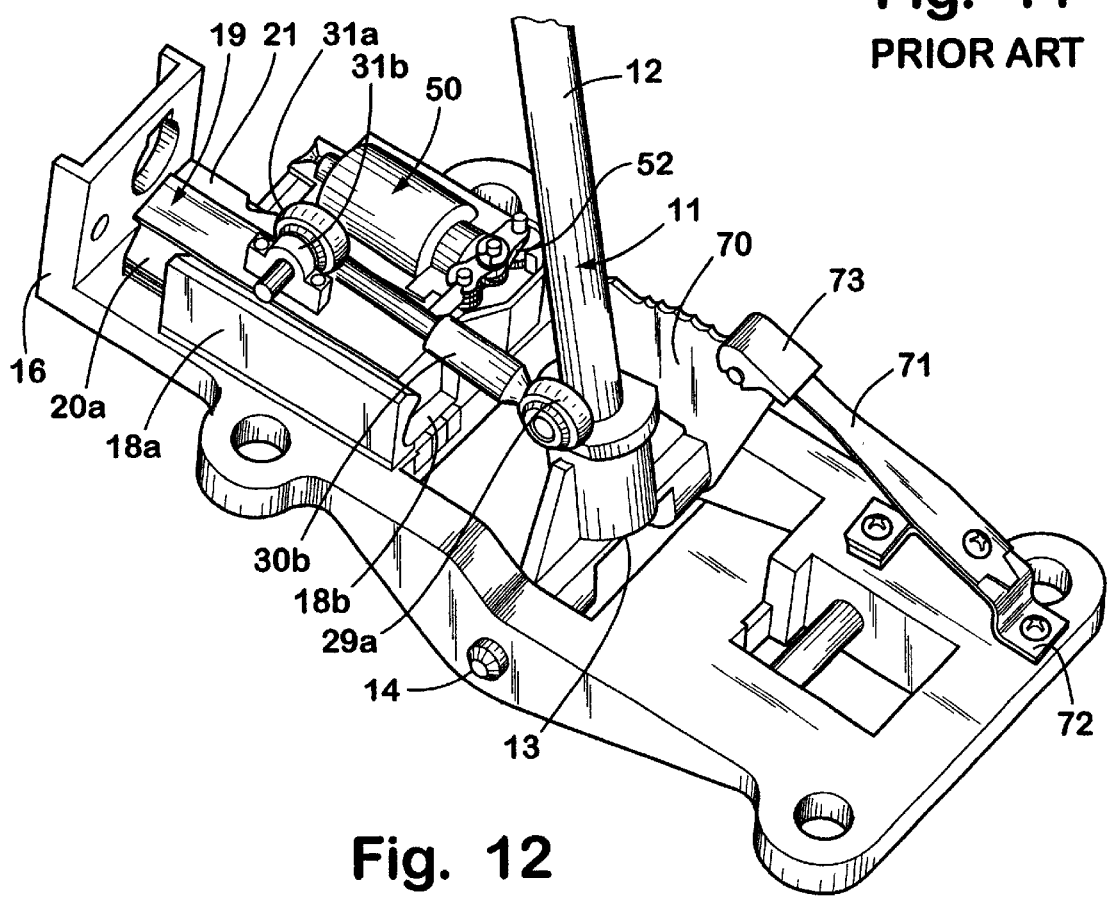
FIG. 12 is a side, top perspective view similar to that of FIG. 11 but disclosing the design of a shift lever mechanism which is different in providing a shift lever for transmitting a shorter throw to the detent member, such design being specially designed for controlling transmissions with electronic signals.
Figure 16:
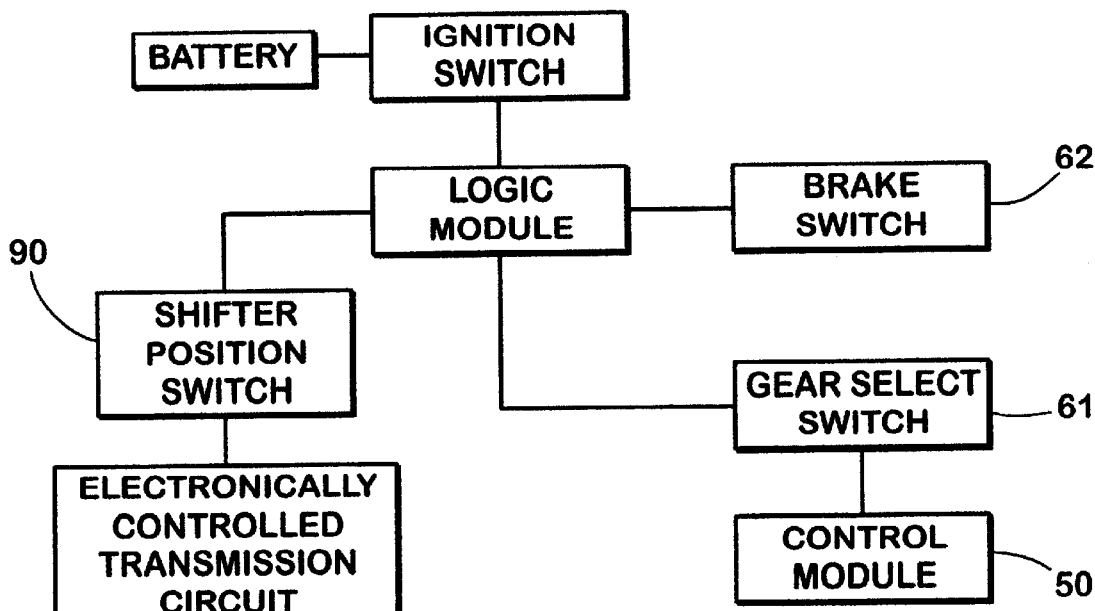
FIG. 16 is a circuit diagram illustrating a circuit for controlling an electronically controlled transmission utilizing the shifter mechanism of FIG. 12.

FIG. 12 shows another concept in which the stroke multiplier assembly 22 of FIGS. 1–11 is eliminated and connecting rod 30b is directly connected to the shift lever assembly 11 and the detent assembly 19a. Such connection is accomplished by the end 29a being pivotally connected to a shift lever assembly by the pin 29b and the end 31a being pivotally connected to the detent assembly 20a by the pin 31b. This arrangement of FIG. 12 provides for a very short stroke of the detent assembly and is especially useful for generating different electrical signals for each gear position of the transmission so as to control the shifting of the transmission by electronic means rather than by connecting the transmission to the movable detent assembly 19 by a cable or rod 33 as disclosed in FIGS. 1–11.

FIGS. 17–21 disclose a shifter position switch assembly comprising detent assembly 19a mounted as disclosed above in relation to the module 50 and locking element 56. Detent assembly 19a includes the detent member 21, block 20a, and a switch pack 90 which controls the "Shifter Position Switch" of FIG. 16. Block 20a includes a series of small indentations 91 on one of its surfaces. These indentations are provided for three switches 90a, 90b, and 90c mounted in line with each other in the switch pack 90 to determine which position the detent assembly is in. As the detent assembly 19a moves from one gear position to the other, the indentations cause different combinations of the switches to be opened or closed. As a result, as the detent assembly 19a is moved by the shift lever assembly 11 upon pivoting of the shift lever 12, i.e., so as to move from gear position to gear position, different signals are generated by switch pack 90 to produce signals in the "Shifter Position Switch" which signals are transmitted to the circuit of the "Electronically Controlled Transmission Circuit" of the electronic circuit of FIG. 16. Thus, switch pack 90 generates signals which control the electronic control for the transmission. It is obvious that more than three switches can be arranged if more combinations of switches are needed.

Figure 22:
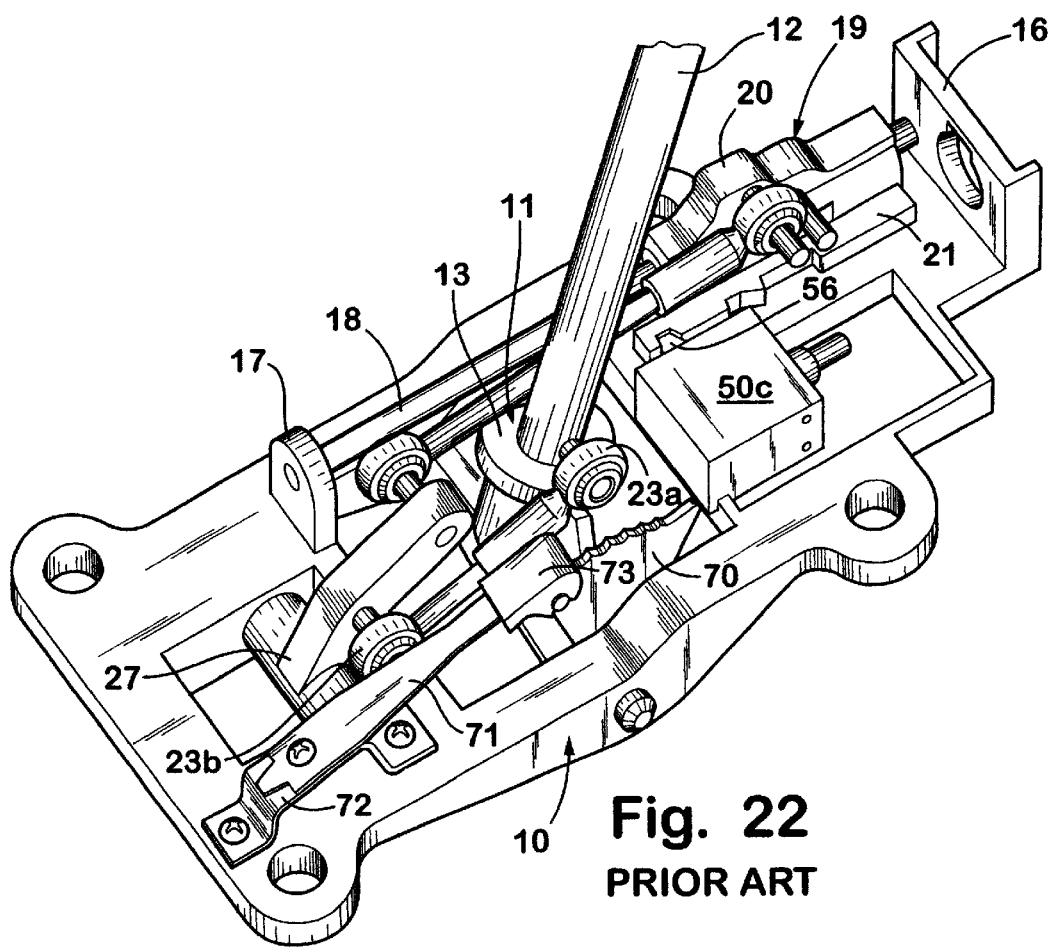
FIG. 22 is a rear, top perspective view of another modification of this invention.

FIG. 22 shows another embodiment of the shifter which is identical to the embodiments of FIGS. 1–9 except that module 50c is a solenoid without a mechanical advantage such as the toggle linkage disclosed in FIGS. 1–9. It is to be understood that within the broadest aspect of this shifter, any workable means for actuating locking member 56 in "PARK" can be utilized.

IMPROVEMENT

In the modification shown in FIG. 23, we have added an electric multi-position sensing device, i.e., sensor 100, to sense the position of the shift lever 12. Further, we have operably connected the sensing device 100 to an on-board controller 101 or computer on a vehicle. The illustrated controller 101 receives input from the sensing device, determines a velocity of the shift lever 12, and is operably connected to the vehicle power train 102 to control the vehicle transmission, the vehicle clutch, and/or the vehicle engine. It is contemplated that the controller 101 could comprise a chip, microprocessor or other processor device, and can be mounted on the shifter itself or in other locations in the vehicle. Additionally, it is noted that the controller 101 can be a separate unit, or can be an integral part of a vehicle on-board controller or computer for running the vehicle power train. The illustrated sensing device 100 and the controller 101 make up a shifter system that provides electronic shifting of the transmission and that eliminates the mechanical connection of a shifter to a transmission (i.e., eliminates a Bowdan transmission cable and/or other rod-type mechanical linkage), although it is noted that their function of sensing shift lever velocities can be combined with other shifter systems such as those using Bowdan cables and the like, as will be apparent from the discussion below. Also, the present invention could be used with any power train system for operating a vehicle, including gas engine systems, electric vehicles, and the like.

Advantageously, the present shifter system is adapted to sense, determine, and/or calculate the speed or velocity of movement of the shift lever 12, such that the controller 101 can vary control of the power train in a manner responsive to the vehicle driver's shifting behavior, as described below. It is contemplated that the controller 101 could be programmed to sense, determine, and/or calculate the acceleration of the shift lever 12 as well. Sensing/determining/calculating the velocity and/or the acceleration of a shift lever is potentially important and/or useful for several reasons. This information allows the shifter system to anticipate when to shift transmission gears. In turn, the shifter system can be made more responsive to the shifting circumstances, as well as to the vehicle operator. Transmission gear and/or clutch engagement can be made variable, so that both a smooth engagement and a short/quick engagement are possible in the same vehicle depending on the shifting behavior of the vehicle driver.

The illustrated sensing device 100 (FIG. 23) includes a membrane potentiometer 104 attached to a side 105 of detent assembly 19, and a spring-biased roller assembly 106 attached to module 50a for engaging the potentiometer 104. Roller assembly 106 (FIG. 24) includes a housing 107 attached to module 50a in a stationary position. An extendable carrier 108 is telescopingly and slidingly mounted within housing 107 and biased outwardly by a spring 108__. A roller 109 is rotatably attached to an end of the carrier 108. Roller 109 is positioned to roll along potentiometer 104 as the shifter 12 is pivoted between various gear positions, including park "P," reverse "R," neutral "N," drive "D," and low drive "L."

Potentiometer 104 is a membrane-type potentiometer, such as is made by Spectra Symbol Company, located in 3101 West 2100 South, Salt Lake City, Utah 84119 under the trademark SoftPot® or by Memtron Technologies, Inc. located at 530 N. Franklin Road, Post Office Box 207, Frankenmuth, Mich. 48734. The membrane potentiometer 104 includes multiple layers 110–114 (FIG. 24A), at least two layers of which (i.e., layers 112 and 114) can be pressed together to complete the circuit. The insulator layer 113 defines multiple discrete positions representing at least the gear positions PRND, for example. Alternatively, it is contemplated that the insulated layer 113 can be constructed to provide a continuous incrementally variable voltage signal from the potentiometer, the signal being an analog voltage signal representative of the shifter position. Advantageously, the potentiometer 104 can be operated in relatively severe environmental conditions, which is required for most modem vehicle-shifters. The controller 101 (FIG. 23) is programmed to receive signals from the potentiometer 104 through wires 115.

In a preferred form, the controller 101 has a timer and/or is otherwise programmed to otherwise determine the velocity and/or the acceleration of movement of the shift lever 12, and to vary control of the transmission and shifting accordingly. For example, the controller 101 could be programmed to respond to quick movement of the shift lever 12 by providing quicker, rougher, stiffer gear shift and clutch engagement in the transmission. The controller 101 could also be programmed to cause engine rpm to temporarily change or to cause the air/fuel mixture and/or the spark plug firing to change appropriately in response to the speed/velocity of movement of the shift lever 12. It is contemplated that a person of ordinary skill in the art of vehicle mounted controllers for vehicle power trains would be. able to program a controller in such a manner, such that a detailed description of such a program and its method is not needed herein to understand the present invention. Such a program would be based on user preferences and expectation and would be specified by a vehicle manufacturer. It is also contemplated that a person of ordinary skill in vehicle electronics would be able to use electrical components as needed to dampen out or eliminate undesirable electrical noise and/or false sensor readings from vehicle or shifter vibration, if such dampening were required based on actual parameters and conditions of a given vehicle electrical system.

It is noted that, in the potentiometer-defining discrete gear positions, one or more discrete positions not associated with the gear positions PRNDL could be used to assist in obtaining data needed for calculating the shift lever velocity, particularly as a shift lever lifts or enters a particular gear position. For example, a discrete sensor location could be located immediately prior to the discrete sensor location defining the drive position "D" so that the location of the shift lever 12 can be sensed just before the shift lever 12 enters the drive position "D." This would allow the shifter to anticipate shifting of the transmission. By sensing the time period that expires before the shift lever 12 actually arrives in the drive position "D," the controller can calculate a shift lever velocity and can vary control of the transmission shifting accordingly.

FIG. 25 shows another potentiometer 104A that can be used in place of potentiometer 100. Potentiometer 104A includes a pair of parallel resistive conductive strips 120 and 121. Roller 109 is conductive such that as roller 109 rolls along strips 120 and 121, the roller 109 completes a circuit between the strips 120 and 121. Thus, the circuit defined by strips 120 and 121 and roller 109 varies depending on the position of the shift lever 12. This variable length represents a variable resistance that corresponds to the position of the shift lever 12. Accordingly, a voltage potentially communicated to strips 120 and 121 results in an analog signal that continuously reflects the position of the shift lever 12.

FIG. 26 shows another sensor 100B that can be used in place of sensor 100. Sensor 100B includes a plurality of Hall Effect sensors 130, including at least one sensor for each of the gear positions PRNDL of the shift lever 12. Each sensor 130 senses the position of the roller 109 as it approaches the respective sensor 130. Notably, some of the illustrated sensors 130 are positioned between gear positions PRNDL to provide added data on the position of its shift lever and the shift lever velocity.

It is contemplated that the roller 109 could be modified so that it does not physically contact sensor 100B, but instead allows proximity sensing without physical contact, thus eliminating wear and improving assembly by allowing adjustments in the system to be made electronically instead of physically. Further, more sophisticated adjustments can be made, such as by adjusting the hysteresis of the sensor to change activation/deactivation characteristics of the sensors. Such sensors and sensor technology is available from various companies, such as ITT Company in Angola, Ind., which sells Hall Effect sensors under the designation HALL 200 and similar product designations.

Figure 27:
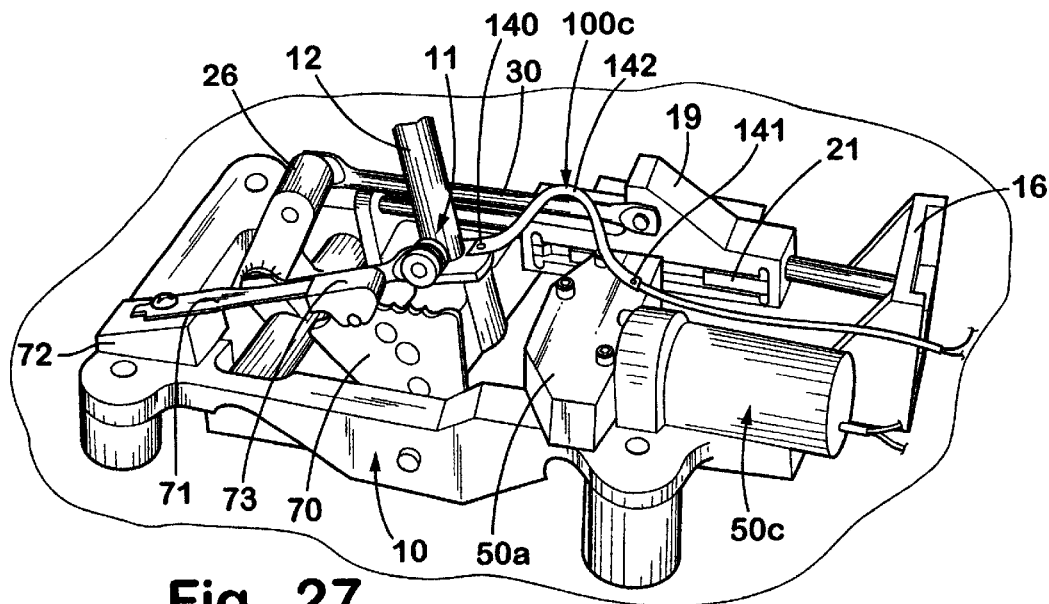
FIG. 27 is a perspective view of a sensing device operably connected between the shift lever and the shifter base, including a flexible member.

FIG. 27 discloses a sensor 100C having one end 140 attached to the shift lever 12 and a second end 141 attached to a stationary location, such as module 50a. Sensor 100C includes a bendable and deformable body 142 that flexes as the shift lever 12 is pivoted between gear positions. Body 142 is constructed of material that changes its resistivity as it is flexed, thus providing an analog output voltage representing the position of the shift lever 12 at all times. Thus, it acts much like a continuous variable resistance potentiometer. Notably, the sensor 100C could be replaced with a stretchable sensor, such as an elastic membrane with appropriate forgiving/stretchable circuits printed therein, or that it could also be replaced with a telescoping potentiometer attached between a shift lever 12 and a stationary position, such as module 50a.

It is contemplated that the sensing devices 100, 100B, and 100C and potentiometers 104, 104A, and 104B could be used on shifters having a more conventional construction, such as shifters shown in U.S. Pat. Nos. 5,277,077; 5,220,984; and 5,211,271, and the disclosures of these patents are accordingly incorporated in their entirety herein by reference. It is contemplated that the present shifting technology can also be used on manual shifters and, in particular, shifters for autoclutched manual transmissions, such as those manufactured by Automotive Products Kongsberg AS, Dyrmyrgate 45, Post Office Box 62, N-3601 Kongsberg, Norway. For example, sensing devices and/or potentiometers could be placed along the orthogonal shift paths for a shift lever for manual shift transmissions having an H-shaped shift pattern.

MODIFICATION

Figure 28:
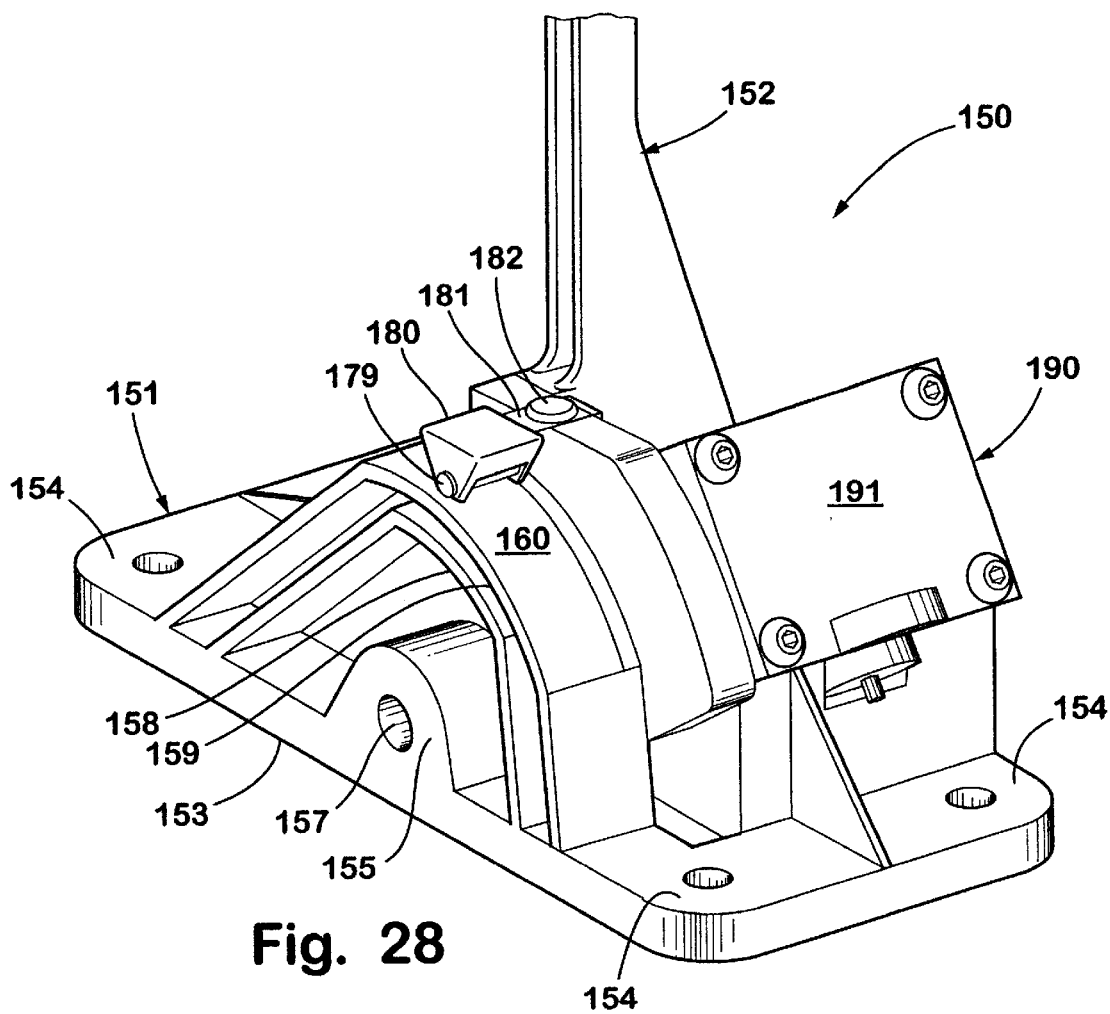
FIG. 28 is a perspective view of another shifter embodying the present invention including a shift lever pivoted to a base and a circumferentially positioned potentiometer for sensing the angular position of the shift lever.
Figure 29:
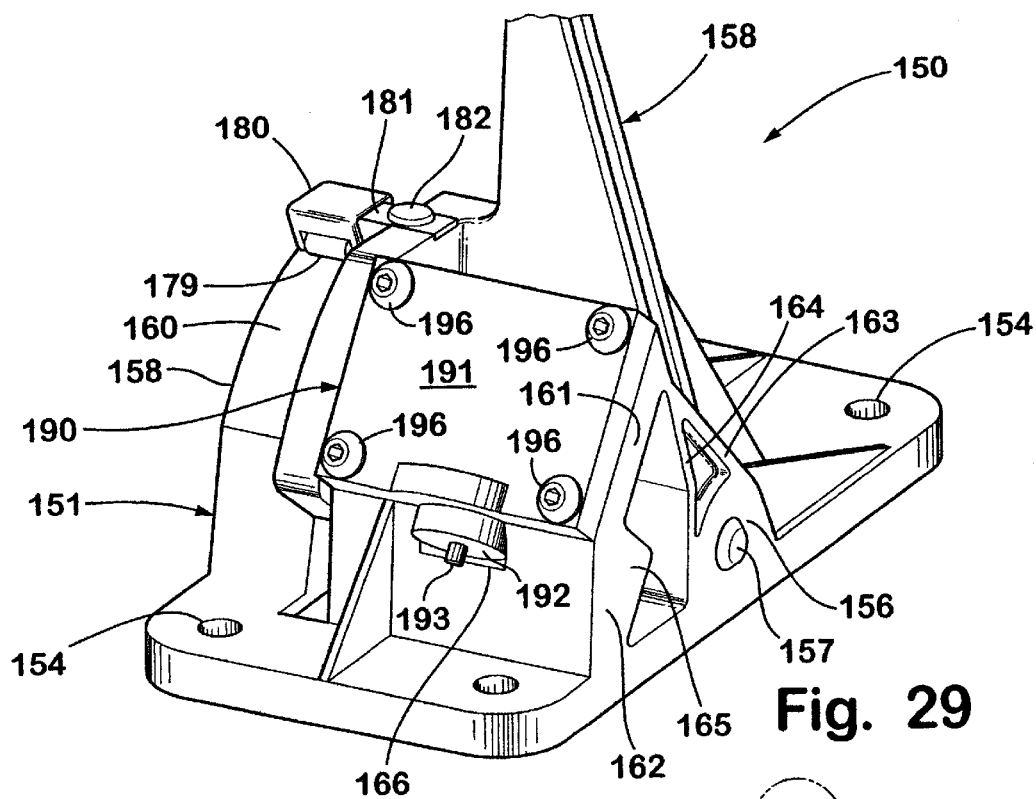
FIG. 29 is a perspective view of the shifter shown in FIG. 28 but taken from a different side.

A shifter 150 (FIGS. 28 and 29) embodying the present invention includes a base 151 and a shift lever 152 pivoted to the base 151. The base 151 includes a bottom 153 with apertured flanges 154 configured for attachment to a vehicle floor pan or other component. A pair of spaced apart pivot mounts 155 and 156 are formed on opposing sides of the bottom 153. The pivot mounts 155 and 156 include aligned apertures, and are configured to receive a pressfit pivot pin 157 for pivotally mounting the shift lever 152, as discussed below. An arch 158 is formed over mount 155, and includes an arcuate surface 159 for receiving a continuous output potentiometer 160 or other sensing device, such as the sensors previously described herein. A pawl mount 161 (FIG. 29) is formed generally over and inboard of pivot mount 156. The pawl mount 161 is supported by support walls 162 and 163, and by reinforcement ribs 164 and shift lever stop 165. An aperture 166 is formed in support wall 162 for reasons discussed below. The total height of the base (e.g., from its pivot to its sensor) may vary, but it is contemplated that it can be made as low as one inch or less depending upon the sensitivity of the sensing device and the corresponding electrical control system. For example, some sensors will satisfactorily operate over just a few millimeters stroke. This allows a bottom of the shifter to be made surprisingly and unexpectedly smaller, as compared to mechanical systems that are necessarily much larger in order to obtain enough movement for safe and sure operation.

Figure 30:
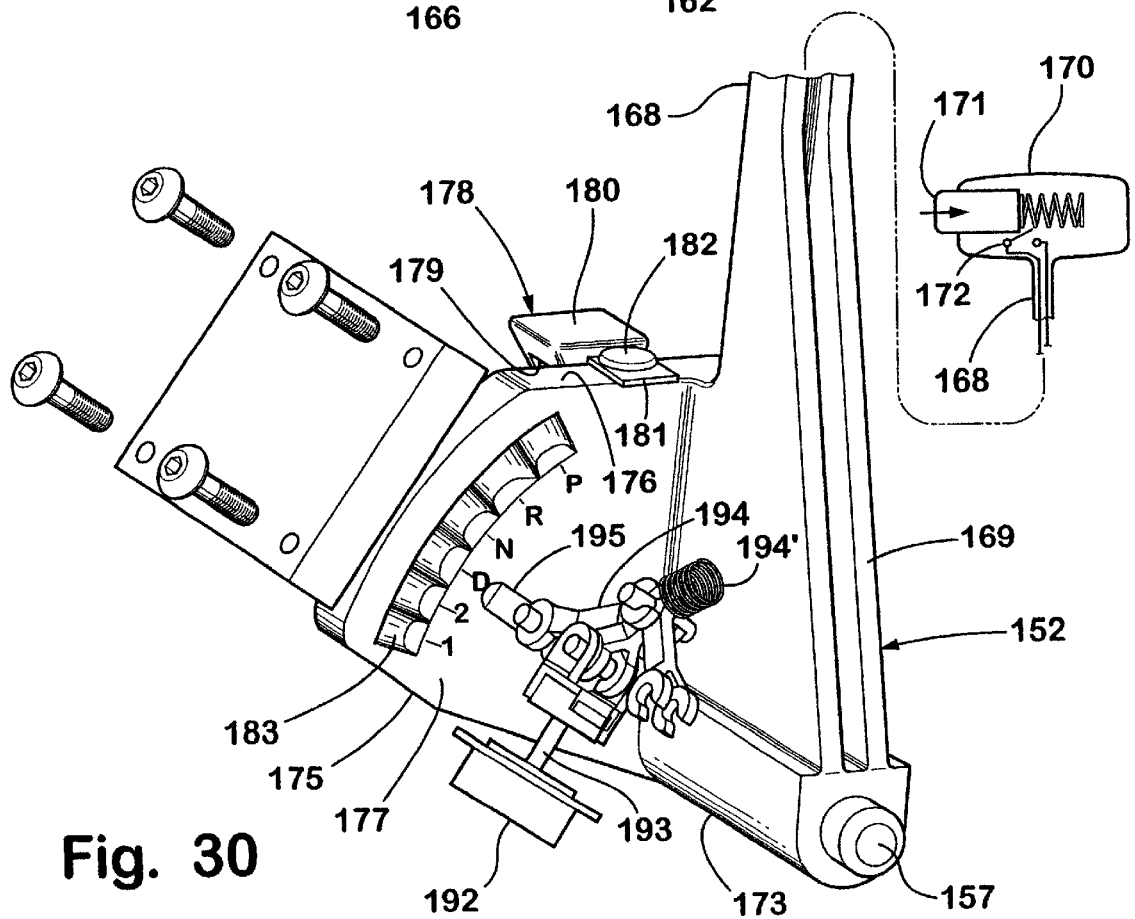
FIG. 30 is an exploded perspective view of the shifter shown in FIG. 29.

The shift lever 152 includes a post 168 (FIG. 30), and a molded pivot 169 attached to a bottom of post 168. A handle 170 is attached to a top of post 168, and includes an actuation button 171 spring-biased outwardly, but movable/depressible to close a switch 172 operably wired to the vehicle shifter control system. Notably, the post 168, molded pivot 69, and/or handle 170 can be integrally. molded as a single molding if desired. The molded pivot 169 includes an enlarged transversely-elongated section 173 having a bore for receiving the pivot pin 157. The pivot pin 157 can be pressfit or snap locked into the pivot mounts 155 and 156, or can be retained therein by clips or fasteners attached to ends of the pivot pin 157, or in other ways known in the art for retaining pivots pins for shift levers.

A detent-forming wall 175 (FIG. 30) extends forwardly on molded pivot 169 transversely to elongated section 173. Detent-forming wall 175 includes a top surface 176 and an inside surface 177. An arm 178 (FIGS. 28 and 30) including a roller 179, a roller carrier 180, and a leaf spring 181 is attached to top surface 176 with a screw 182 so that the roller 179 moves along potentiometer 160 as the shift lever 152 is pivoted between gear positions. Notably, it is contemplated that the present invention includes replacing the potentiometer 160 and roller 179 with different sensing packages, such as optical, mechanical, magnetic, electric, and other sensing arrangements.

An arcuate channel 183 (FIG. 30) is formed on the inside, surface 177 of detent-forming wall 175. The channel 183 includes depressions defining various gear positions including park "P," reverse "R," neutral "N," drive "D," second gear "2," and first gear "1." The angled surfaces on the sides of the gear positions are inclined to provide a desired amount of bias toward a center of the selected gear positions as a pawl engages the depressions, as described below.

An electromechanically operated pawl module 190 (FIG. 29) is attached to pawl mount 161 of base 151. Module 190 includes a frame: 191, a voice coil actuator 192 with an extendable rod 193 (FIG. 30), a toggle linkage 194 with bias spring 194_, and a pawl 195 for engaging depressions in channel 183. Frame 191 is attached to pawl mount 161 with screws or fasteners 196. The toggle linkage 194, pawl 195, and voice coil actuator 192 with rod 193 are operably interconnected and mounted on frame 191. This interconnecting structure was previously disclosed herein, such as in the discussion relating to FIGS. 11 and 14. Advantageously, the voice coil actuator 192 is electrically actuateable to provide different biasing forces, such that the bias of pawl 195 into channel 183 can be varied to provide a desired feel to the vehicle operator during shifting of the shift lever 152. The use of a voice coil actuator 192 is believed to be novel and non-obvious in the illustrated shifter arrangement.

A voice coil is advantageous since it provides a more efficient operation over an electromagnet while providing a smaller more compact size. Advantageously, a voice coil can be biased in either of two opposing directions, and with varying amounts of force. This allows the voice coil to provide multiple functions, such as gear position feel, gear position detenting of the shift lever, and shift lever park locking functions.

Figure 31:
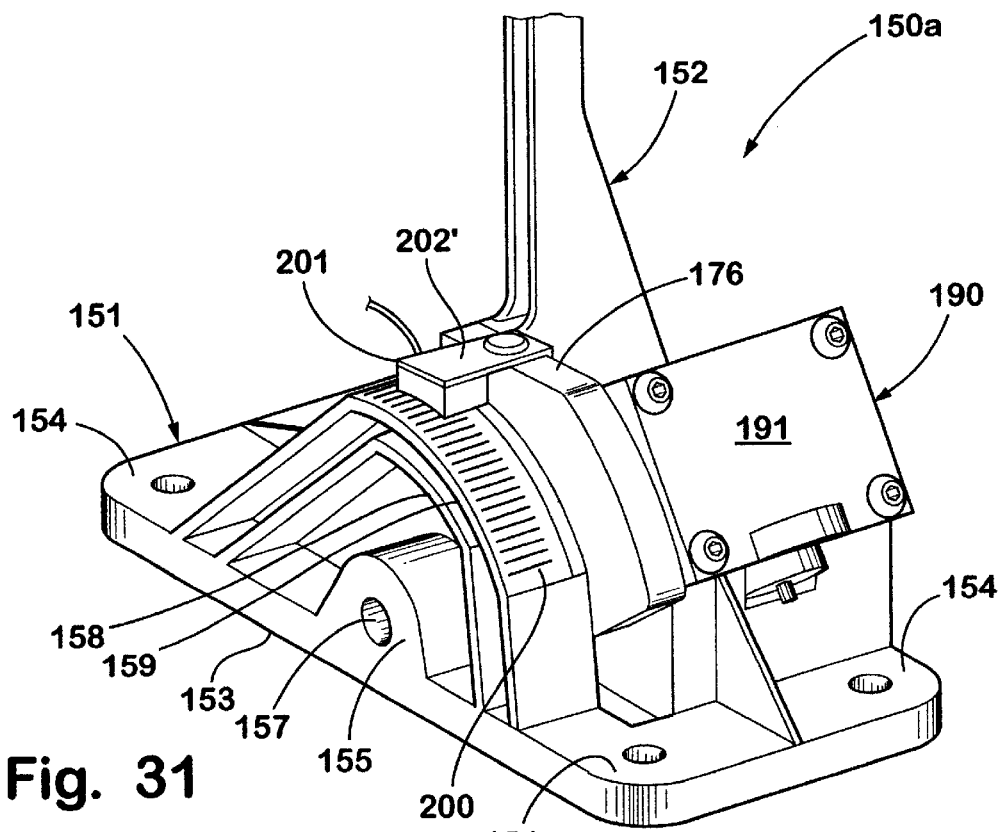
FIG. 31 is a perspective view of a modified shifter similar to that shown in FIG. 28, but incorporating a bar code reader.

FIG. 31 illustrates a shifter 150A that incorporates a bar code strip 200 on arcuate surface 159, and a bar code reader/sensor 201 attached to shifter 152 at surface 176 by bracket 202. The arrangement forms an optical encoder arrangement for sensing shift lever positions by counting or reading the bands on the strip 200. A "zero" location can be imprinted on the strip 200 if desired.

Figure 32:
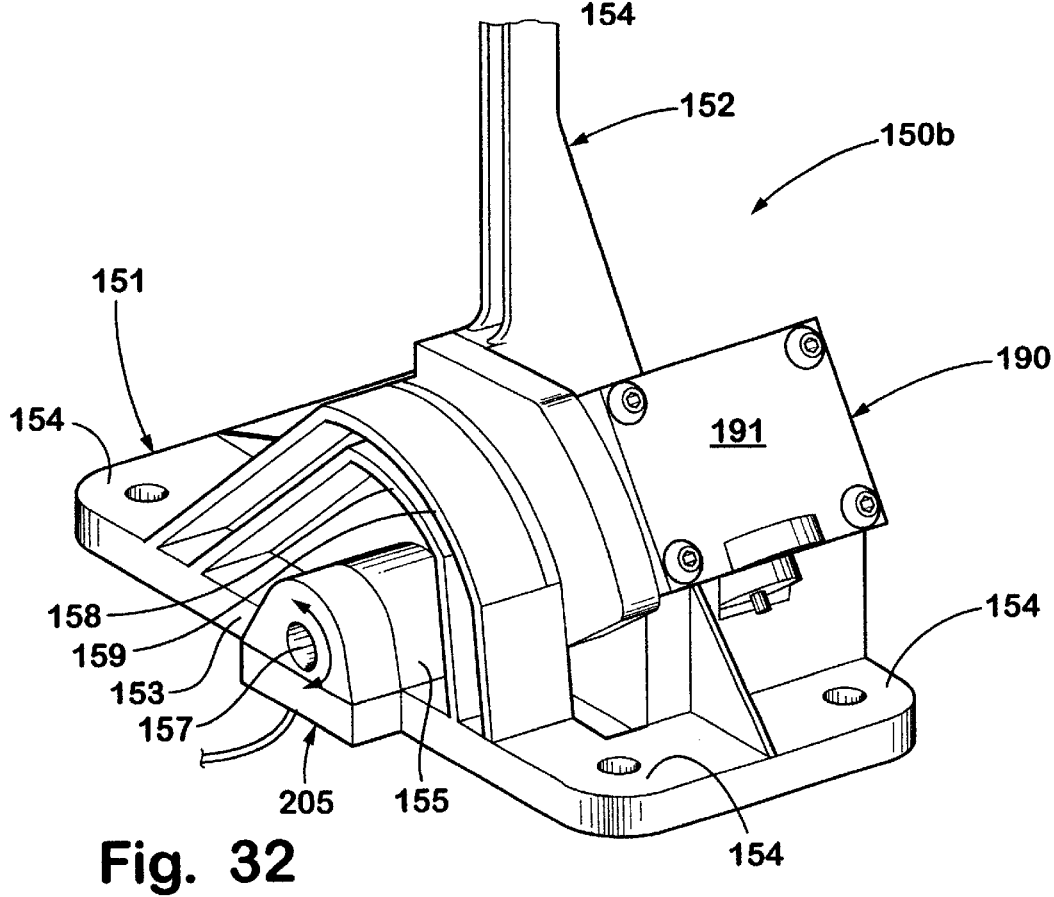
FIG. 32 is a perspective view of another modified shifter similar to that shown in FIG. 20, but incorporating an axially mounted encoder.

FIG. 32 illustrates a shifter 150B having a mechanical encoder 205 operably attached to pivot mount 155 and rotatable pivot pin 157. The rotation of shift lever 152 rotates pivot pin 157 and results in rotating an internal portion of the encoder 205, thus resulting in sensing movement of the shift lever 150A. The encoder can be selected to provide the greater or lesser amounts of data on the angular position of the shift lever 152, depending on the functional specifications and requirements of the shifter design.

Figure 33:
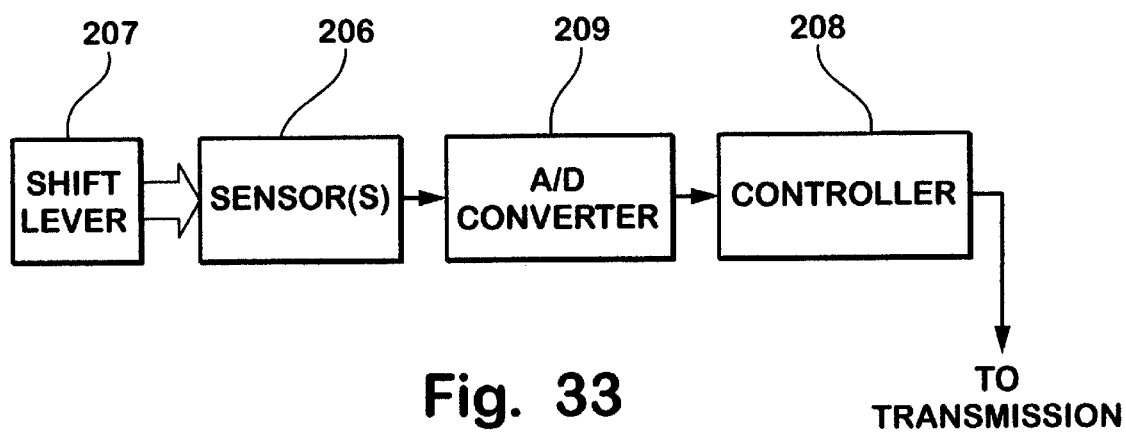
FIG. 33 is a schematic diagram of an electrical circuit for the shifter of FIGS. 28, 31, and 32.

FIG. 33 shows an exemplary electrical circuit in block form, which may be used to process or otherwise relay the information obtained from the shifting mechanism of the present invention. As shown in FIG. 33, the electrical circuit preferably includes one or more sensors 206 for sensing the movement and position of a shift lever, which is generally designated with reference numeral 207. The electrical circuit further includes a controller 208 coupled to sensor 206. Controller 208 analyzes the output from sensor 206, determines the position and velocity of shifting mechanism 207 based upon the output from sensor 206, and generates power train (engine and transmission) outputs/control signals based on preprogrammed criteria stored in either the internal memory (not shown) of controller 208, or stored in an external memory. Depending upon the type of sensor 206 that is used, an analog-to-digital (A/D) converter 209 may be provided to convert an analog output from sensor 206 into a digital numeric value for subsequent processing by controller 208.

As will be appreciated by those skilled in the electrical arts, A/D converter 209 may be either a separate component connected between sensor 206 and controller 208 or an integral component of either sensor 206 or controller 208.

Controller 208 preferably includes a programmable microprocessor, such as the vehicle system control processor or the transmission control processor that are typically provided in most vehicles. Alternatively, a separate processor may be provided for interacting with the transmission control processor. Such a separate processor could be provided in proximity to the shifting mechanism or may be provided anywhere else in the vehicle. In accordance with the principals of the present invention, the only significant constraints of such a processor are that it is capable of receiving output signals from the sensor(s) 206, and that it is capable of generating a control signal(s) to directly or indirectly affect the manner in which the vehicle transmission shifts between gears. For example, the controller can include a timer, or a signal generated at a timed sequence can be applied to the sensor, to provide a time-indicative signal to the controller.

As pointed out above, sensor 206 may be configured in many different ways and positioned in many different ways relative to shifting mechanism 207. Sensor 206 may sense discrete positions as shown in FIG. 26, or may sense positions along a continuum as shown in FIG. 25. Using the potentiometer-type sensor, as shown in FIG. 26, the resistance level of the sensor varies for each discrete position 130. By passing a constant current level through sensor 100B, the resistance of the sensor may be determined by sensing the voltage level output from the sensor. This voltage level may be converted into a digital value by A/D converter 209 and supplied to controller 208. Controller 208 may then determine the relative position of the shift lever based upon the digital value received from sensor 206 through A/D converter 209.

In a preferred embodiment of the present invention, the discrete positions of sensor 100B include discrete positions for each of the PRNDL positions and for positions intermediate these PRNDL positions. By providing such intermediate position output signals, controller 208 may receive an earlier indication of when a driver has moved the shift lever from one of the PRNDL positions than it would otherwise receive if such intermediate position output signals were not provided. In the conventional electronic shifting systems, electrical output signals are only provided when the shift lever is in one of the PRNDL positions. Thus, if a driver were to shift from the low "L" position to the drive "D" position, the conventional transmission controller would only begin shifting from the low gear to one of the drive gears once the shift lever has reached the D position. Although it may only take one second for the driver to move the shift lever from the L to D position, the controller and transmission could perform numerous operations to prepare for such a shift in gears within this time. Therefore, the present invention utilizes this form of intermediate feedback from the shifting mechanism to begin the shifting process in anticipation of the shift lever subsequently reaching the D position. Hence, the delay that typically occurs during shifting in the conventional automatic shifting assemblies, can be substantially reduced or avoided. Clearly, by providing intermediate feedback between the other PRNDL positions, shifting gears between these relative states may also be performed more expeditiously.

It should be noted that the conventional shifters that utilize electronic sensors for sensing movement of the shift lever into the PRNDL positions, do not begin shifting until the shift lever has reached a position different from that in which the shift lever was previously located. The reason that the shifting operation is not performed as soon as the transmission controller senses that there is no output received from the sensor (indicating that the shift lever may have been moved from its last location), is that vibrations may cause the shift lever to move in and out of contact with the electronic sensor despite the fact that the shift lever has not been moved from its last position. Therefore, the conventional systems rely upon positive feedback that the shift lever has, in fact, reached a different location from its previous location.

As an alternate construction for allowing the transmission controller to anticipate a shift in gears, the electronic output signal obtained by depressing pawl switch 171 may be monitored through a connection to controller 208.

If the sensor is configured to provide varying output signals throughout the continuum between all the relative shifting positions, such as shown in FIG. 25, controller 208 may not only anticipate the shifting of gears, but may also determine the velocity at which the shift lever is moved between positions. The velocity may also be determined by providing a plurality of discrete positions between each of the PRNDL positions, or between the R, first, second, third, fourth, and fifth gear positions. As will be explained in greater detail below with respect to the embodiments pertaining to a manual shift mechanism, such velocity information may be used by the transmission controller to vary the control of a vehicle transmission clutch to produce a "harder" or "smoother" shift.

To determine the velocity of the shift lever, controller 208 samples a digital value provided from sensor 206 at a predetermined rate. If an 8-bit A/D converter 209 is used, the output from sensor 206 may be converted into a digital numerical value anywhere between 0 and 255. Hence, the relative velocity may be determined by determining the change in the numerical value between each sample. Further, controller 208 may average the velocities as they are determined or may calculate the acceleration of the shift lever based on detected changes in velocity. Based on the calculated velocity, controller 208 may access a look-up table to retrieve therefrom the appropriate control and timing signals to transmit to the various solenoids and valves within the transmission to affect the appropriate shifting profile for the detected velocity.

When a sensor such as the optical encoder shown in FIG. 31 is utilized, controller 208 is programmed to calculate the velocity by counting the number of equally-spaced bar code lines that the optical sensor is moved past within a predetermined time interval. Further, by counting the number of lines that the sensor has moved past since the last gear position, controller 208 may determine which gear position the shift lever is currently in and which positions it may be moving between.

Figure 34:
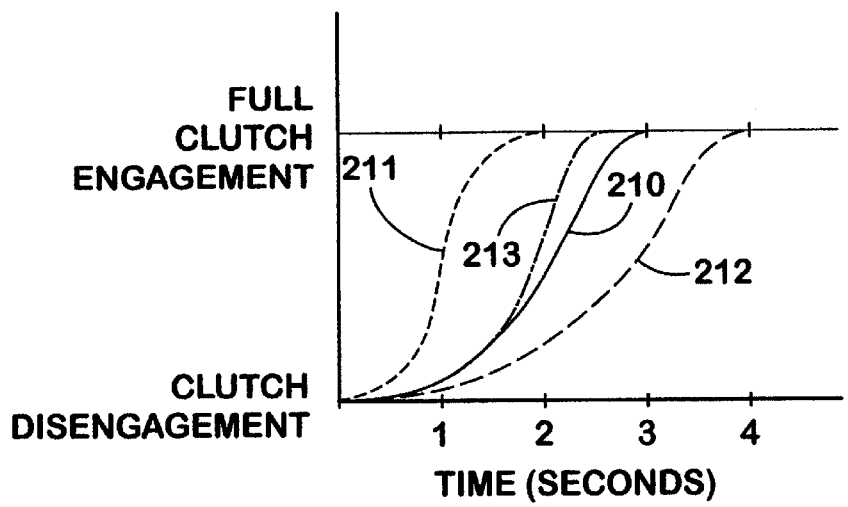
FIG. 34 is a schematic illustrating the speed of clutch engagement over time, and how the speed of clutch engagement can be affected.

FIG. 34 illustrates variation in the control of a vehicle transmission clutch over time. The solid line 210 illustrates a "normal" or average engagement of a clutch, which may occur over two or three seconds, for example. Actual times may vary from this, and specifically can be much longer such as 4 seconds or more, or can be much shorter such as only parts of a second, as controlled by the controller 208. For purposes of discussion, the line 210 illustrates a clutch fully engaged over a three-second interval with a sinusoidal-type engagement. Dashed line 211 illustrates a sharper/harder engagement line wherein the clutch is fully engaged over a two-second time period, such as will be programmed to occur if a driver quickly moves a shift lever into a selected gear position with a relatively rapid velocity or with quick acceleration/deceleration of the shift lever as it moves into the selected gear position. Dashed line 211 represents a "sport shift" type of engagement. The second dashed line 212 illustrates a "luxurious shift" type of clutch arrangement, where the clutch engages more slowly over a span of about four seconds. The dot/dash line 213 illustrates a clutch engagement that occurs over about three seconds, much like the line 210. But in line 213, most of the clutch engagement occurs between one and two seconds of time. Thus, a sharp engagement is felt by the driver as the clutch engages, but the expected time delay of about one second occurs between the initial shift lever movement and the actual engagement of the transmission. The change from line 210 to line 213 represents a change in the clutch engagement of about 10%, or about 0.5 second. The variation from line 210 to line 212 represents a change in the clutch engagement of about 25%, or about 1.0 second. This change in clutch engagement can be accomplished by different means, such as by the controller 208 controlling engine RPM, transmission pressure and/or transmission fluid delivery, solenoid or electromechanical operation of clutch engagement components, and other means known to those skilled in the art for controlling the mechanics of clutch engagement.

Figure 35:
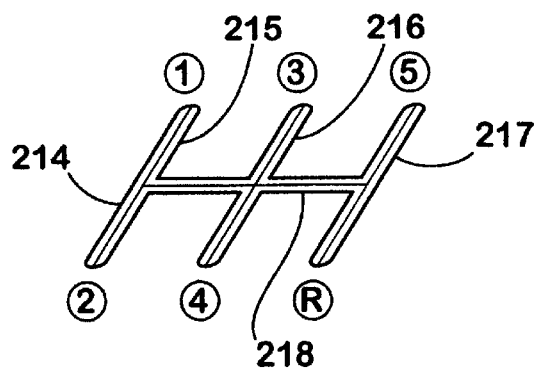
FIGS. 35–38 are schematic diagrams showing various shift patterns and potentiometers positioned thereon to sense orthogonal movement of a shift lever.

FIGS. 35–38 represent different shifting patterns using aspects of the present invention. These figures show the flexibility of the present inventive concepts. However, it is noted that use of the present inventive concepts is not contemplated to be limited to only these disclosed embodiments. FIG. 35 shows a five-speed "double H" shaped shifting pattern 214, where four potentiometers 215–218 are positioned adjacent segments of the shifter path. Specifically, potentiometer 215 is positioned along the 1–2 shift plane, potentiometer 216 is positioned along the 34 shift plane, potentiometer 217 is positioned along the 5-R shift plane, and potentiometer 218 is positioned along the transverse neutral shift plane. A sliding contact (not specifically shown) is attached to the shift lever that moves along and contacts the potentiometers 215–218 as the shift lever is shifted along path 214. By providing separate input ports on controller 208 to receive the outputs from these additional sensors, the position and speed of movement of the shift lever is thus known at all times by the controller 208. Notably, two separate potentiometers could be used to sense movement of the shift lever from neutral into first gear, and to sense movement of the shift lever from neutral into second gear, instead of the single potentiometer 215. The same is true for potentiometers 216–218. Further, it is contemplated that all of the potentiometers 215–218 could be replaced with a plurality of location-specific/discrete-position sensors (see FIGS. 24A, 26, and 31). For this purpose, the neutral position is considered to be a gear position.

Figure 36:
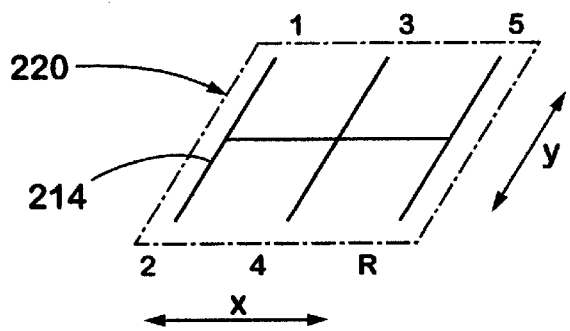

FIG. 36 illustrates a two-dimensional sensor pad 220 (defined by the dashed line) configured to sense movement of a shift lever along "X" and "Y" orthogonally related directions. The five-speed "double H" shifting path 214 is overlaid onto this sensor pad 220. The specific location of any point on the sensor pad 220 is read, by a vehicle controller as an (X,Y) point, such that information on the exact location and movement of the shift lever is continuously provided to the controller for controlling shifting.

To monitor movement of a shift lever in two dimensions, controller 208 is configured with two input ports, one for receiving the X component from sensor pad 220 and one for receiving the Y component. Using a potentiometer-type, two-dimensional sensor pad, such as those available from Spectra Symbol, 3101 West 2100 South, Salt Lake City, Utah 84119, the resistivity of the sensor changes independently with respect to the X and Y directions. For example, when the shift lever is moved in plane 214 between the first and second positions, the resistivity remains constant with respect to the X output of sensing pad 220 while the resistivity appearing at the Y output varies continuously between the first and second gear positions. Given the pattern shown in FIG. 36, it will be apparent that only one of the two digital values sensed by controller 208 will change at any instance in time. If, for example, controller 208 determines that the input digital value corresponding to the movement of shift lever in the X direction is changing and that the Y value is relatively constant, controller 208 may determine that the shift lever is moving in the neutral plane. Similarly, if the X value is relatively constant and within a first predetermined range while the Y value is changing, controller 208 may determine that the shift lever is moving in the 1–2 shift plane. If the Y value is changing but the X value is in a second predetermined range, controller 208 may determine that the shift lever is moving within the 3–4 shift plane. Similarly, if the X value is relatively constant and within a third predetermined range and the Y value is changing, controller 208 may determine that the shift lever is moving in the 5-R shift plane. Importantly, clutch engagement is related to the shift lever position. For example, this allows the controller to control not only actual clutch engagement in an automatic or autoclutched manual transmission, but also allows the vehicle controller to begin taking steps to prepare for shifting, such as beginning to raise or lower certain transmission fluid pressures, and to begin to release locking or safety mechanisms.

Although sensor pad 220 is shown as a two-dimensional rectangular pad, a sensor capable of sensing movement in two dimensions may be constructed using two or more one-dimensional potentiometers or by placing potentiometers at each shifter gate.

By establishing certain ranges or values for each of the respective shift positions 1–5, and R, controller 208 may readily ascertain which gear has been selected by the driver. Because the translation of actual shift lever position to the respective shift positions is established by software rather than the mechanical construction of the shifting mechanism, the shifting pattern may be altered for different vehicles or customized for particular drivers simply by reprogramming controller 208 without requiring any change to the mechanical structural arrangement of the shifting mechanism. For example, a particular manufacturer or driver may wish to alter the shift pattern shown in FIG. 36 such that the reverse position is changed to the fifth gear position, the fifth gear position is changed to the fourth gear position, the fourth gear position is changed to the third gear position, the third gear position is changed to the second gear position, the second gear position is changed to the first gear position, and the first gear position is changed to the reverse position.

Figure 37:
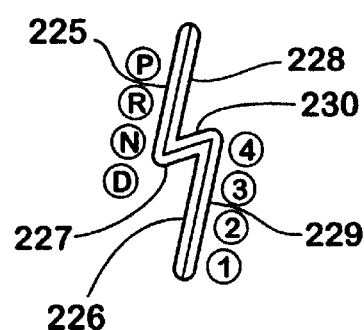
Figure 38:
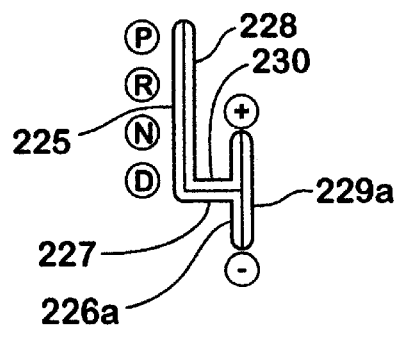

FIGS. 37 and 38 illustrate shift patterns for shifters having an automatic mode and a manual mode. In FIG. 37, the path is "Z" shaped and includes a first section 225 defining traditional PRND automatically-shifting gear positions. The second section 226 defines gear-specific positions, wherein a particular selected gear is forced onto the transmission. Notably, the controller would be programmed to prevent shifting in unsafe ways, such that a driver could not force a shift lever into first gear when going at a high rate of speed. A transverse shift-over path segment 227 is provided between sections 225 and 226. Potentiometers 228–230 are placed along sections 225–227, respectively, to sense shifter location. The system may be programmed or otherwise configured to sense discrete positions between gear positions 1, 2, 3, 4, and/or to calculate velocity of the shift lever between gear positions 1, 2, 3, 4, while providing shifting operations only upon placement of gear lever in one of the PRND positions when the shift lever is positioned along section 225. Also, position and/or velocity may be sensed and/or calculated based upon signals from potentiometer 228 when the shift lever is in path section 227. The shifter path of FIG. 38 is H shaped, and includes a segment 225 and a segment 227, and corresponding potentiometers 228 and 230. However, a modified segment 226A is positioned next to segment 227 and includes an upshift or "+" location and a downshift or "−" location. Potentiometer 229A is positioned adjacent segment 226A where it is adapted to sense the position of the shift lever at all times. The shifter may be arranged to provide and/or calculate the velocity of the shift lever only when the shift lever is in segment 226A such that potentiometer 229A provides a signal when the shift lever is between the "+" and "−" positions to permit quicker shifts in segment 226A. Also, the system may be programmed or otherwise configured to provide shifting in section 225 only upon placement of the shift lever one of the PRND gear positions, without sensing or calculating the position and/or velocity of the shift lever between the PRND gear positions.

In existing automatic transmission systems, oil pressure is regulated to control the clutches and bands such that torque is transferred smoothly, in a manner that is ideally imperceptible to the driver. However, according to the present invention the position and/or velocity and/or acceleration of the gear lever when in segments 226 or 226A may be utilized to regulate the oil pressure controlling the clutches and bands in the transmission in a manner providing a quicker and harsher gear shift. Significantly, the potentiometers 229 and 229A are arranged to provide signals corresponding to the shift lever position throughout path segments 226 and 226A, such that the position and/or velocity and/or acceleration of the shift lever may be sensed and/or calculated not only at the gear positions 1, 2, 3, 4 (segment 226); "+", "−" (path 226A), but also throughout the range of gear lever positions between gear positions. The time interval required to change in gear lever position may be utilized to calculate the velocity and/or acceleration of the gear lever by taking a derivative of position with respect to time. For example, the velocity of the gear lever may be calculated by dividing the change in position of the gear lever by the time required to move the gear lever between the two positions utilized to calculate the changing gear positions. Similarly, the acceleration of the shift lever may be calculated by determining a change of velocity, and dividing the change of velocity by the time expired during such change of velocity. Accordingly, one or more discreet positions of the shift lever between gear positions 1, 2, 3, 4, or "+" and "−" may be utilized to sense the position of the gear lever in such intermediate positions, and, in combination with the time required for the shift lever to move between the discreet intermediate positions may be utilized to calculate the velocity and/or acceleration of the shift lever. More specifically, a pair of points between the gear positions may be utilized to calculate a time derivative of position with respect to time to determine the velocity and/or acceleration of the shift lever. Because potentiometers 229 and 229A provide a continuous signal corresponding to the position of the shift lever, virtually any two or more points along the shift path maybe utilized to calculate the shift lever velocity and/or acceleration at virtually any point (position) along the shift path. Also, the gear positions themselves and one or more intermediate points between the gear positions could also be utilized to calculate velocity and/or acceleration by taking a derivative of position with respect to time.

The position and/or velocity and/or acceleration of the shift lever may be utilized to provide an input signal to the ECU, and the ECU may be programmed to alter the shift feel in response to this new variable, while still allowing the traditional smooth shift feel under normal conditions, such as when the shift lever is positioned along shift path section 225 of the shift patterns of FIGS. 37 and/or 38. In an automatic transmission, the variable pressure solenoids of the electrohydraulic unit (valve body) modulate pressure to the clutches of the automatic transmission during a shift, hence controlling the shift feel. Because the valve body is driven by the ECU, the control algorithm of the ECU may be programmed to control the rate of actuation of the clutches by modulating the pressure to the clutches during a shift. The variable pressure solenoid can be controlled with a variable input directly proportional to the rate of gear change input (i.e. shift lever velocity) from the driver. This control input may be in the form of the velocity (or acceleration) of the shift lever in the manual shift lane 226 or 226A (FIGS. 37, 38), and may include velocity of the shift lever between gear positions. While manually initiating an upshift of downshift, the velocity and/or acceleration of the shift lever is sensed (or calculated), compared to a pre-programmed set of values ("look up table"), and a control signal sent from the ECU to the valve body. The look up table could include control parameters for the valve body wherein increasingly higher shift lever velocities correspond to control signals to the valve body providing increasingly harsher shifts due to the increasing rate of engagement of the clutches and/or bands of the automatic transmission. Thus, the gear change mode or feel may be controlled proportionally to the input signal, or shift lever of velocity. Thus, according to the present invention, a new data point is available to the ECU in addition to the historical variables. This allows the automatic transmission to react continuously and proportionally to the controls of driver, not only through the traditional inputs such as vehicle speed, engine RPM, throttle position, etc., but now in a more directly connected manner through the action of the gearshift lever. This. arrangement truly provides a "manual control" of an automatic transmission and greatly enhances the driving experience.

Through the use of a two-dimensional sensor pad 220, a manual shifting mechanism may be provided in which a transmission controller anticipates the gear into which the vehicle is going to be shifted by monitoring the movement of the shift lever between gear positions. For example, if the driver is shifting the vehicle from first gear directly to third gear, controller 208 may quickly determine that the vehicle is not being shifted into second gear as soon as it determines from the X and Y output values that the shift lever is moving in the neutral plane rather than continuing in the 1–2 shift plane toward second gear. Then, as soon as the shift lever is moved from the neutral plane into the 3–4 shift plane toward. the third gear position, controller 208 may anticipate the shift into third gear and begin sending the appropriate control and timing signals to the various internal components of the transmission in order to commence the shift into third gear before the shift lever ever reaches the third gear position. Thus, shifting may be performed without the delays that would be associated with a conventional electronic shifting arrangement whereby the shift into third gear would not even begin until the shift lever had reached the third gear position. As a result of this feature, the shifting mechanism of the present invention provides control over the transmission shifting that is very much the same as that experienced with a manual shifting mechanism utilizing a mechanical linkage. Essentially, the speed and movement of the lever can be made to simulate a clutch engagement and disengagement.

As described above, by providing intermediate positional information between the respective gear positions, the shifting mechanism of the present invention provides information to the transmission controller that enables it to calculate the velocity at which the shift lever is being moved so as to affect a "harder" or "smoother" shift between gears. The amount of variance in the feel of the shift resulting from sensing the velocity of the shift lever may vary from vehicle to vehicle. For example, the amount of variance in a luxury car may be greater than that provided in a sports car. Regardless of this difference in variance between vehicles, the shifting mechanism of the present invention may be implemented without structural modification in each of the different types of vehicles. To affect the change in variance for each vehicle type, the controller 208 may be differently programmed for each type of vehicle in which it is to be installed. Such programming may be performed by the manufacturer of that particular component at their facility, or may be performed before or after installation within each vehicle at the assembly plant.

Further, the shifting profile for the vehicle may be programmed or modified by reprogramming at a dealership or other service center. Thus, the particular shifting response provided by the present invention may be customized for each individual driver's preference. For example, for two individuals that share a vehicle employing the shifting mechanism of the present invention, the controller may utilize two different shifting profiles for the respective users. To provide for such customization, controller 208 preferably has an additional input port coupled to the vehicle accessory controller to receive a driver identification code that may be transmitted from each driver's respective key fob of a remote keyless entry system.

An additional advantage to monitoring movement of the shift lever between positions is that any movement into the reverse gear may be closely monitored by controller 208 to prevent inadvertent shifting into reverse. By providing controller 208 with data representing the vehicle speed, controller 208 could prevent shifting into reverse when the vehicle is moving forward at any significant speed.

As will be appreciated by those skilled in the art, controller 208 may be programmed to take into account other parameters in determining which shift control parameters to utilize during a shift between any particular gears. For example, controller 208 may be programmed and configured to receive data from the vehicle's speedometer such that it also takes into account the acceleration of the vehicle at the time of a shift in addition to the velocity of the shift lever to determine the appropriate hardness or smoothness of the shift. Other parameters that could be utilized are the throttle position, engine speed, input shaft speed, output shaft speed, and the volume of fluid required to engage the clutches for the required shift.

Although the shift lever velocity or "speed" data has been described above as being used to determine the hardness or smoothness for the transmission to shift between gears, such shift lever velocity data may be utilized or manipulated in various different ways by the controllers provided in the vehicle. Further, the intermediate positional shift lever data may also be utilized in various manners different from those described above. In addition, the specific manner by which the transmission affects the change in the hardness or smoothness of a shift may also vary significantly. For example, the transmission controller may vary the speed at which the gears are changed and/or the speed at which the clutch of an autoclutched manual transmission is moved into or out of engagement in response to the sensed shifter velocity.

It should be further noted that controller 208 may be programmed to look at the values obtained from the sensor (s) differently depending upon whether the driver is shifting up or shifting down. For example, it may be desirable to increase the hardness of the shift with increasing shift lever velocities when shifting into a higher gear, while being undesirable when shifting into a lower gear since a smooth shift into a lower gear is almost always more desirable unless the vehicle is a sport car, in which case it may be desirable to enable the driver to cause a harder shift by moving the shift lever faster even when shifting into a lower gear.

Controller 208 may also look at the positional data received from the sensor(s) differently, based upon whether the shift lever is being moved from a gear position or into that gear position. For example, when the shift lever is in the first gear position, the controller will consider the shift lever to be in the first gear position so long as the digitized value(s) received from the sensor(s) is/are within a first predetermined range. When the shift lever is moved from the first gear position, such that the output from the sensor(s) is no longer within the first predetermined range, controller 208 will consider the shift lever as no longer being within the first gear position. On the other hand, controller 208 may establish a different predetermined range to define the first gear position, when the shift lever is being moved from another gear position into the first gear position. Thus, a hysteresis may be established between any two gear positions by appropriately programming controller 208.

It should be noted that the primary advantage provided by the present invention is to provide additional information from a vehicle shifting mechanism to which a processor within the vehicle may be programmed to respond. The specific manner in which such processors are programmed to respond to this additional information is expected to vary considerably amongst the numerous vehicle manufacturers and amongst those drivers who wish to customize the performance of their vehicles.

Figure 39:
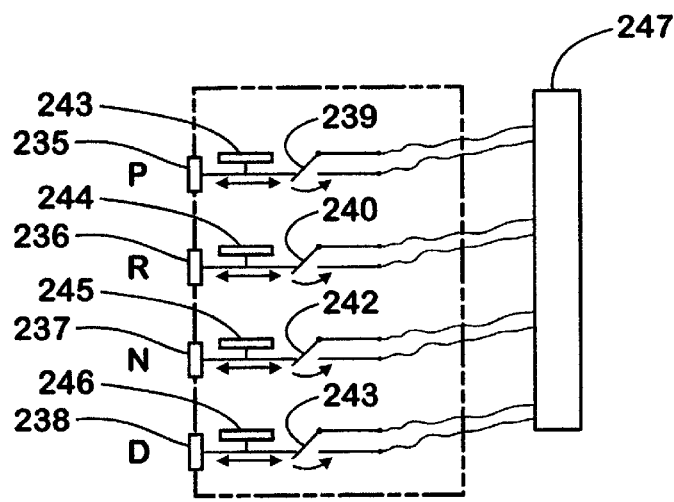
FIG. 39 is a schematic illustrating a push-button device for controlling a transmission, the device incorporating potentiometers for sensing the speed of movement of buttons as the buttons are depressed to select gears.

It is contemplated that the present invention can be extended to a push-button operated shifting system, such as illustrated in FIG. 39. Push-buttons 235–238 for selecting gear position PRND are located in a module or instrument panel 239. By pressing one of the push-buttons 235–238, a corresponding one of switches 239–242 is activated for controlling a vehicle transmission. Potentiometers 243–246 correspond to push-buttons 235–238, and are connected to a vehicle controller 247 to sense the velocity of force or movement when the buttons 235–238 are depressed. Similar systems/sensors are used in electronic piano keys, for example, so that the loudness of sound generated matches the hardness that a piano key is struck. It is noted that switches 239–242 can be eliminated by programming controller 247 to sense that push-buttons 235–238 have been depressed, as well as to sense the velocity of the depression.

The present sensing system is useable on manually-clutched manual transmissions as well as autoclutched manual transmissions and "clutchless" manual transmissions. Autoclutched manual transmission systems are different than "clutchless" manual transmissions in that the "clutchless" manual transmissions require a manual connection to the gear box. In the "clutchless" manual transmissions, the operator still actually moves the gears through a cable or other mechanical link. Only the clutch function is automechanized. An autoclutch manual transmission automates both clutch and gear change functions, but does so with mechanisms attached to the transmissions, as opposed to automatic transmissions where components are incorporated into and inside of the automatic transmission casing. All transmissions can be at least partially controlled by some sort of processor, which in turn receives electrical signals from the shifter.

In the foregoing description, it will be readily appreciated by those skilled in the art that modifications may be made to the invention without departing from the concepts disclosed herein. Such modifications are to be considered as covered by the following claims, unless these claims by their language expressly state otherwise.

The invention claimed is:

1. A shifting system for controlling shifting of an automatic transmission of a motor vehicle, comprising:
   a manually operated shift lever movable along a first shift path having at least one gear position wherein the transmission is shifted automatically without movement of said shift lever, and a second shift path wherein the transmission is shifted in response to a change of position of said gear lever;
   a controller programmed and configured to control shifting the transmission when moving the shift lever in either of the first and second shift paths;
   a sensor operably connected with said shift lever when said shift lever is located along said second shift path, said sensor operably connected with said controller and providing a signal to said controller corresponding to at least one of the position and velocity of said shift lever when the shift lever is located along said second shift path, said controller adapted to control transmission shifting sequence based, at least in part, upon a time derivative of position of said shift lever in the second shift path.

2. The shifting system set forth in claim 1, wherein:
said second shift path includes an upshift position for shifting to the next higher gear, and a downshift position for shifting to the next lower gear.

3. The shifting system set forth in claim 2, wherein:
the first shift path includes park, reverse, neutral, and drive gear positions.

4. The shifting system set forth in claim 3, wherein:
said first and second shift paths are parallel, with a transverse shift-over segment extending between and interconnecting the first and second shift paths.

5. The shifting system set forth in claim 1, wherein:

the second shift path includes at least first, second, and third gear positions.

6. The shifting system set forth in claim 5, including:

a transverse shift-over segment interconnecting said first and second shift paths to form an H-shape.

7. A motor vehicle, comprising:

a powertrain including an engine and an automatic transmission;

a shifting system controlling shifting of the automatic transmission, said shifting system comprising:

a manually operated shift lever movable along a first shift path having at least one gear position wherein said transmission is shifted automatically without movement of said shift lever, and a second shift path wherein said transmission is shifted in response to a change of position of said gear lever;

a controller programmed and configured to control shifting the transmission when moving the shift lever in either of the first and second shift paths;

a sensor operably connected with said shift lever when said shift lever is located along said second shift path, said sensor operably connected with said controller and providing a signal to said controller corresponding to at least one of the position and velocity of said shift lever when the shift lever is located along said second shift path, said controller controlling a transmission shifting sequence based, at least in part, upon a time derivative of position of said shift lever in the second shift path.

8. The motor vehicle set forth in claim 6, wherein:

the first shift path includes park, reverse, neutral, and drive gear positions.

9. The motor vehicle set forth in claim 7, wherein:

said second shift path includes an upshift position for shifting to the next higher gear, and a downshift position for shifting to the next lower gear.

10. The motor vehicle set forth in claim 9, wherein:

said first and second shift paths are parallel, with a transverse shift-over segment extending between and interconnecting the first and second shift paths.

11. The motor vehicle set forth in claim 7, wherein:

the second shift path includes at least first, second, and third gear positions.

12. The motor vehicle set forth in claim 11, wherein:

a transverse shift-over segment interconnecting said first and second shift paths to form an H-shape.

13. A shifting system for controlling shifting of an automatic transmission of a motor vehicle, comprising:

a base;

a manually operated shift lever movably mounted to said base and movable along a first shift path having park, reverse, neutral, and drive gear positions, and a second shift path generally parallel to said first shift path, and a transverse shift path extending between said first and second shift paths, said second shift path having an upshift gear position at a first end thereof, and a downshift gear position at a second end thereof;

a controller programmed and configured to control shifting of the shifting of the transmission when moving the shift lever in said second shift path without mechanical linkage;

a potentiometer operably connected with said shift lever when said shift lever is in said second shift path and providing a variable signal to said controller corresponding to the position of said shift lever, said controller adapted to control a shift speed of the transmission based upon the velocity of the shift lever in said second shift path.

* * * * *